United States Patent [19]

Mikami et al.

[11] Patent Number: 5,477,291

[45] Date of Patent: Dec. 19, 1995

[54] CAMERA WITH PLURAL LENSES FOR TAKING CONSECUTIVE EXPOSURES

[75] Inventors: Yuji Mikami; Kazuo Kamata, Kanagawa, both of Japan

[73] Assignee: Fuji Photo Film Co., Ltd., Kanagawa, Japan

[21] Appl. No.: 319,787

[22] Filed: Oct. 7, 1994

[30] Foreign Application Priority Data

| Oct. 12, 1993 | [JP] | Japan | 5-254518 |
| Oct. 12, 1993 | [JP] | Japan | 5-254519 |
| Dec. 22, 1993 | [JP] | Japan | 5-325255 |
| Dec. 22, 1993 | [JP] | Japan | 5-325257 |
| Feb. 18, 1994 | [JP] | Japan | 6-020973 |
| Feb. 18, 1994 | [JP] | Japan | 6-021067 |

[51] Int. Cl.$^6$ ................................................. G03B 1/00
[52] U.S. Cl. .......................... 354/120; 354/125; 354/219
[58] Field of Search ................................. 354/120, 125, 354/219

[56] References Cited

U.S. PATENT DOCUMENTS 3,202,069  8/1965  Cummins et al. .
3,443,499  5/1969  Gianino .
4,884,087 11/1989  Mochida et al. .
4,972,649 11/1990  Mochida et al. .

5,210,557  5/1993  Kameyama et al. .
5,264,882 11/1993  Kameyama et al. .

FOREIGN PATENT DOCUMENTS 5-45697  2/1993  Japan .

Primary Examiner—Monroe H. Hayes
Attorney, Agent, or Firm—Young & Thompson

[57] ABSTRACT

A consecutive taking camera is adapted to taking eight exposures time-sequentially in a single frame on photo film. Four shutter disks are provided with a shutter slit and rotated from an initial position upon a single releasing operation. Each shutter slit is moved past two stationary openings. A shutter-driving slide plate with a spring is moved in a releasing direction upon the releasing operation, and rotates the shutter disks. A governor mechanism is disposed in fashion couplable with the slide plate, and reduces speed of rotation of the shutter disks. The governor mechanism is coupled with, and uncoupled from, the slide plate by an intermittent toothed wheel. The intermittent toothed wheel sets the coupled state when the shutter slit is away from the stationary openings. The intermittent toothed wheel exits from the coupled state to set the uncoupled state in response to coming of the shutter slit to a predetermined angular position, which is respectively a predetermined angle short of the stationary openings. The intermittent toothed wheel keeps the uncoupled state while the shutter slit is moved past the stationary openings.

44 Claims, 30 Drawing Sheets

CAMERA WITH PLURAL LENSES FOR TAKING CONSECUTIVE EXPOSURES

BACKGROUND OF THE INVENTION

1. Field of the Invention

The present invention relates to a consecutive taking camera for taking plural consecutive exposures. More particularly, the present invention relates to a consecutive taking camera of which a shutter device is improved in compact fashion.

2. Description Related to the Prior Art

There is a lens-fitted photo film unit as a single-use camera disclosed in U.S. Pat. Nos. 4,884,087 and 4,972,649. It has a main body, which incorporates a taking lens, a one-frame advance mechanism and a shutter mechanism. The rear of the main body is pre-loaded with 135 film with a cassette in a factory, and covered with a rear cover in light-tight fashion. The front of the main body is covered with a front cover. An operable film-winding wheel is externally rotated after effecting each exposure, to wind the photo film into the cassette. After taking all exposures on the film, the photo film unit is forwarded to a photo laboratory where the film is developed so as to produce photo prints.

There are variants of photo film units for various uses: a flash built-in type, a telephoto type and a close-up type. Besides, there is a camera with plural lenses for taking consecutive exposures, for the purpose of photography of a moving subject in fashion of a set of still photographs taken successively at short intervals: such as a moving form of a sportsman.

There are proposals of a consecutive taking camera: in a first proposal, four consecutive sub-frames are taken within a single frame of the 35 mm full size (24×36 mm) in two rows and two columns; in a second proposal, eight consecutive sub-frames are taken within horizontally arranged two frames of panoramic size (13×36 mm), where each panoramic frame is provided with four sub-frames, as disclosed in U.S. Pat. No. 5,210,557; and in a third proposal, four sub-frames are taken in one row, as suggested in commonly assigned co-pending patent application Ser. No. 08/186,119.

Another proposal of a consecutive taking camera is disclosed in JP-A 5-45697, in which eight consecutive sub-frames are taken in two rows and four columns, with the intention of convenience in apparent recognition of the order in the sub-frames. Eight stationary openings with a fixed aperture stop are arranged in a 2×4 matrix. A shutter device is incorporated, and includes four shutter disks, which have each rotational axis equally distant from two adjacent ones of stationary openings arranged in the direction of moving the film. Each of the four shutter disks is provided with two slits, which are formed in positions at different radii from the rotational axis. The shutter disks are rotated by a motor, to move the slits past the stationary openings time-sequentially for effecting consecutive exposures.

For still photography of a moving subject such as a sportsman, a slit formed in a shutter disk should be moved past a stationary opening at exposure time of at shortest $\frac{1}{125}$ second. If rotation of the shutter disk is excessively fast, a consecutive duration from the beginning to the end of plural exposures may be too short, so that the fast rotation may be unsuitable for covering an apparent motion of the photographic subject. If rotation of the shutter disk is excessively slow, the duration of the whole sequence may be too long, so that the slow rotation may be likely to cause overexposure on the film, and may be unsuitable for covering the fast motion of the photographic subject. The above disclosed shutter device, in view of the situation, is driven by use of a motor, which is controlled by a controller to rotate at a greater speed only during each of the exposures.

However, there is a shortcoming in the consecutive taking shutter device with the motor-driven shutter disk. A camera with the shutter device is highly costly, and requires spaces for containing a battery and a printed circuit board as well as the motor. The motor-driven shutter device is inconsistent to a lens-fitted photo film unit, which should be compact and inexpensive as compared with a camera in general.

The photo film unit has the one-frame advance mechanism as above. An operation of winding the film rotates a driven sprocket wheel. The one-frame advance mechanism responds to an end of advancement of the film as far as one frame, and stops the sprocket wheel and the winding wheel from being rotated even if the winding wheel is pressed rotationally. At the moment of the release of the shutter device, the sprocket wheel and the winding wheel are enabled to rotate.

The operation of photography in a consecutive taking camera requires a duration longer than operation of photography in a simple type of photo film unit for a single exposure, because the latter effects a plurality of exposures upon a single releasing operation. There occurs a problem if the above one-frame advance mechanism is incorporated in a consecutive taking camera: the winding wheel and the sprocket wheel are unlocked immediately upon the triggering of the shutter, so that the winding wheel becomes rotatable before the end of the plural exposures. If the winding wheel is moved at all during some of the plural exposures, the film is inadvertently moved even during the exposure to cause blurs on subject images in sub-frames.

SUMMARY OF THE INVENTION

In view of the foregoing problems, an object of the present invention is to provide a consecutive taking camera having a shutter device adaptable to be designed in compact and inexpensive fashion.

Another object of the present invention is to provide a consecutive taking camera capable of taking consecutive exposures without any irregularity in exposure amounts among them.

A further object of the present invention is to provide a consecutive taking camera in which consecutive exposures can be protected from force inadvertently applied to a winding wheel during the exposing operation.

Still another object of the present invention is to provide a consecutive taking camera in which a shutter disk can be designed somewhat small.

An additional object of the present invention is to provide a consecutive taking camera in which a photographic subject can be easily framed through a viewfinder.

Still another object of the present invention is to provide a consecutive taking camera in which a size, number, and arrangement of sub-frames to be exposed are appropriate in view of convenience.

A further object of the present invention is to provide a camera or consecutive taking camera in which a counter wheel for indicating a frame number is prevented from failing to indicate a wrong number.

In order to achieve the above and other objects and advantages of this invention, a shutter disk is provided with a shutter slit and rotated from an initial position upon a single releasing operation. The shutter slit is moved past plural stationary openings. A drive device moves in a releasing direction in response to the releasing operation, for rotating the shutter disk. A speed reducing device reduces speed of rotation of the shutter disk if coupled with the drive device. A transmitting device is associated with said drive device and/or said speed reducing device, and displaces the drive device and the speed reducing device between coupled and uncoupled states. The coupled state couples the drive device with the speed reducing device. The uncoupled state uncouples the drive device from the speed reducing device. The transmitting device sets the coupled state when the shutter slit is away from the stationary openings. The transmitting device exits from the coupled state to set the uncoupled state in response to coming of the shutter slit to a predetermined angular position, where the angular position is respectively a predetermined angle short of the stationary openings. The transmitting device keeps the uncoupled state while the shutter slit is moved past the stationary openings.

Further, a changeover plate device is movable between first and second positions, located in the first position during a first operating step of the shutter disk, for enabling a first one of two groups comprising the stationary openings, and located in the second position during a second operating step of the shutter disk, for enabling a second one of the two groups.

A preventing device prevents the film from being advanced as far as the one frame until an end of the plural exposures after the releasing operation. To be precise, a winding wheel is externally operated to wind the film as far as the one frame. A driven sprocket wheel is engaged with perforations in the film, and caused to make one rotation by the film wound and moved. A retaining device is adapted to accessing the winding wheel, movable from an unretaining position to a retaining position, located in the retaining position for contacting the winding wheel to disable the winding wheel from being rotated, and located in the unretaining position for moving away from the winding wheel to enable the winding wheel to be rotated. A regulating disk is formed co-axially with the sprocket wheel, for rotating with the sprocket wheel. The regulating disk contacts an end of the retaining device to keep the retaining device in the unretaining position. A receiving hole is formed in the regulating disk, for receiving the end of the retaining device if the sprocket has a predetermined rotational position, to allow the retaining device to move to the retaining position.

In a preferred embodiment, the drive device includes a slide plate, slid in the releasing direction toward a released position and in the charging direction toward a charged position, the shutter disk rotated in response to slide of the slide plate. A biasing member biases the slide plate in the releasing direction. A charging device is connected to the sprocket wheel, for moving the slide plate in the charging direction in response to rotation of the sprocket wheel. A mask plate device is movable between an opening position where the stationary openings are open and a closing position where the stationary openings are closed. A plate displacing device is associated with the charging device for moving in response to movement of the charging device. The plate displacing device locates the mask plate device in the closing position while the slide plate slides in the charging direction. The plate displacing device locates the mask plate device in the opening position while the slide plate slides in the releasing direction.

The plural stationary openings are arranged in a matrix of 2×N, where N is 3 or more. 2N photographic optical systems are respectively associated with the stationary openings, and arranged together to constitute the single frame having an aspect ratio of substantially 16/9, and sequentially enabled for creating respective sub-frames on the photo film.

In another preferred embodiment, a viewfinder is adapted to observing a photographic subject through a rectangular viewfield thereof. A subject frame indicia is formed in the viewfinder and arranged rectangularly. Arrangement of the subject frame indicia has a center located below a center of the viewfield.

Otherwise, a viewfield frame indicia is formed in the viewfinder and arranged rectangularly, for indicating a photographable range. A subject frame indicia is formed in the viewfinder within the viewfield frame indicia and arranged rectangularly, for framing the subject with reference thereof. Arrangement of the subject frame indicia has a center located below a center of the viewfield frame indicia.

In a further preferred embodiment, a counter wheel indicates a number of frames. A one-toothed gear is disposed co-axially with the sprocket wheel, for stepping the counter wheel frame by frame. A charging device is connected to the sprocket wheel, for moving the slide plate in the charging direction in response to the rotation of the sprocket wheel. A gear box is disposed around at least a portion of the sprocket wheel and/or the one-toothed gear. A slot is formed in the gear box to extend toward the counter wheel, for supporting a rotary shaft of the sprocket wheel. The film while wound presses teeth of the sprocket wheel toward the counter wheel at the perforations, for moving the rotary shaft along the slot, so as to press the one-toothed gear against the counter wheel.

In the present invention, the transmitting device stabilizes the rotational speed of the shutter disk to be high the short durations of movement of the slit past the stationary openings. No irregularity in exposure amounts occurs among the consecutively taken exposures, even in use of the speed reducing device. Should such irregularity occur, it would be remarkably conspicuous because of the feature of the consecutive photography: differences in appearance of the finished sub-frames would be apparent to those who would see the photo print; they would tend to visually compare the sub-frames in the observation of the photo print. However, the photo print produced from the film exposed in accordance with the present invention is advantageous over the prior art, as it is not involved with apparently disagreeable irregularity among the exposures.

It is preferred to dispose the mask plate device for blocking the stationary openings during the film advance operation. It is possible to prevent the slit from opening/closing the stationary openings while rotating the shutter disk in the film advancement and the shutter charging, in reverse to the releasing direction.

It is possible to move the shutter slit past each stationary opening at exposure time of at shortest $1/125$ second, in rotating the shutter disk, for the purpose of still photography of a moving subject such as a sportsman. The shutter disk in the present invention may have a small diameter, and may be caused to make two rotations, unlike a conventional shutter disk which has a greater diameter and makes only one rotation. Therefore the novel shutter disk is advantageous as the shutter unit with it can have a small size. The changeover plate device may be disposed behind the shutter disk, which is advantageous as it is easy to construct. In the present invention, it is possible to change the moving direction of the changeover plate device at a high speed, as it may be moved in reverse between the first and second rotations.

The consecutive taking camera for 2×2 sub-frames as referred to above has shortcomings: it is difficult apparently to grasp the order and time sequence of the four sub-frames as recorded; and the four sub-frames upon one releasing operation is so few that it is somewhat inadequate for still photography of a moving subject. In the camera suggested in U.S. Pat. No. 5,210,557, a set of eight consecutive photographs is constituted of two photo prints, each of which has a panoramic frame provided with four sub-frames. The camera is also unadvantageous in that the two photo prints must be correctly arranged before they can be observed in following the order of the exposures, and that the camera causes difficulties in classifying the photo prints, and/or in attaching the photo prints into an album.

To indicate the number of the remaining frames visually at the counter wheel, it is reliably possible in the present invention to engage the one-toothed gear with the counter wheel. It would be conceivable in the prior art to bias a one-toothed gear directly toward a counter wheel. However use of a metal spring for biasing the one-toothed gear would raise the cost and the number of the steps in assemblage, and would be inconsistent to a photo film unit which should be inexpensive. However, the present invention does not require great expense, and is consistent to the inexpensive photo film unit.

It would be also conceivable in the prior art to provide a one-toothed gear with an elliptical portion having a cutout, or to form a one-toothed gear with an eccentric shaft, for the purpose of pressing the one-toothed gear without any spring. However there would be a shortcoming in that an external impact would rotate the counter wheel while a toothless portion of the one-toothed gear might confront the counter wheel without being pressed. However the present invention overcomes such a drawback.

In view of the automated assemblage of the photo film unit, it is desired to have clearance between the one-toothed gear and the counter wheel to a predetermined extent. In the prior art, such adequate clearance has been inconsistent to the reliable engagement of a one-toothed gear with a counter wheel. However the present invention is advantageous in that it is suitable both to the automation in the assemblage and to reliable engagement of the one-toothed gear.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
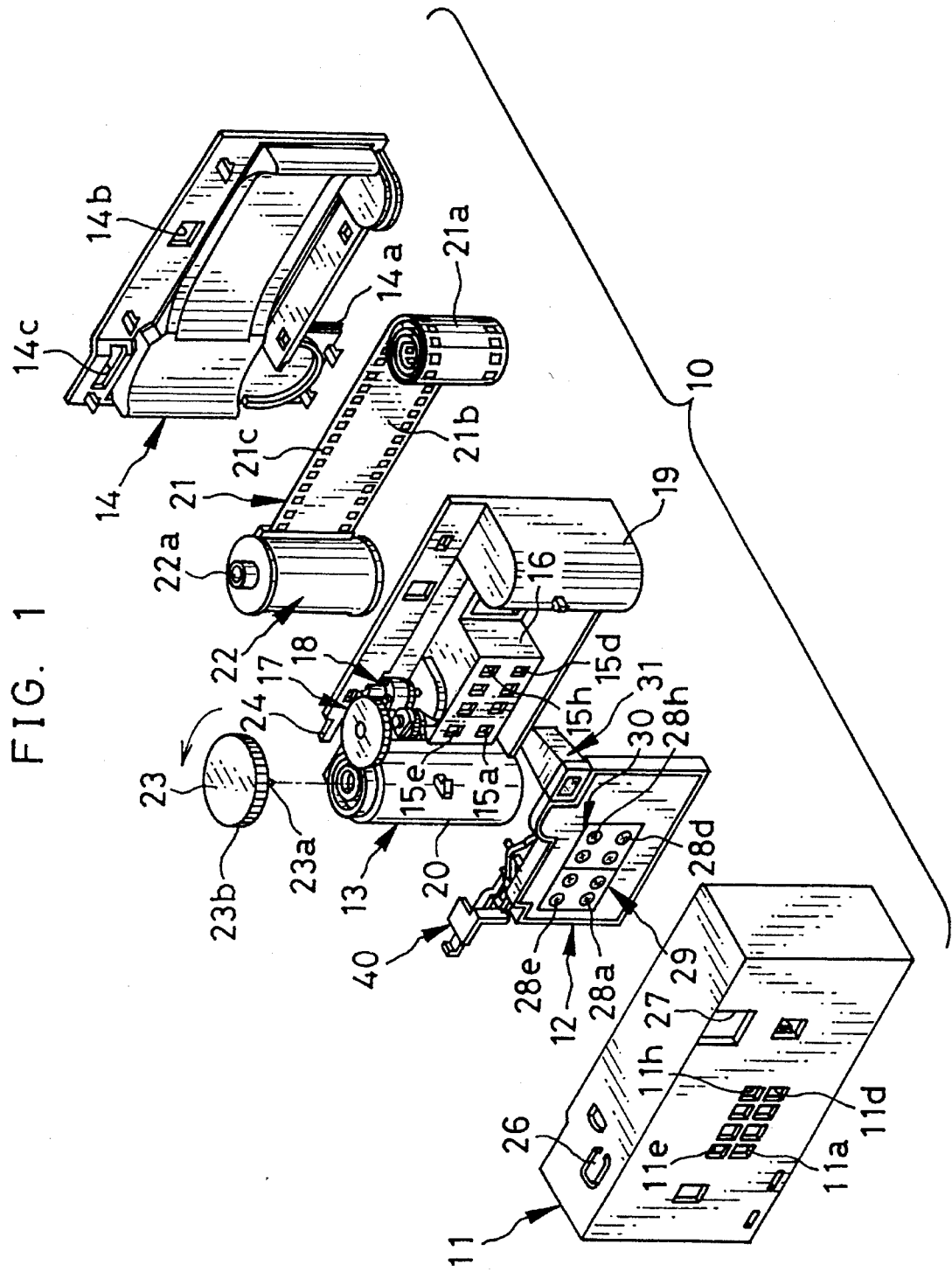
FIG. 1 is an exploded perspective view illustrating a lens-fitted photo film unit in accordance with the present invention.

In FIG. 1, a lens-fitted photo film unit 10, or single-use camera, of a consecutive taking type is constituted of a front cover 11, a consecutive taking shutter unit 12, a main body 13, and a rear cover 14. The shutter unit 12 is inserted between the front cover 11 and the main body 13.

The main body 13 has a dark box or exposure tunnel 16 in which eight apertures 15a to 15h are formed and arranged in a matrix of 2×4. Outside the exposure tunnel 16, there are disposed a one-frame advance mechanism 17 and a film counter mechanism 18.

The exposure tunnel 16 is located between a roll chamber 19 and a cassette chamber 20, both formed in the main body 13. The cassette chamber 20 contains a cassette 22, which is associated with 35 mm-wide unexposed film 21 having been contained in the cassette 22 prior to the assemblage of the photo film unit. The roll chamber 19 contains a roll 21a of the film 21 having been drawn out of the cassette 22. With the rear cover 14 secured to the main body 13, a film surface 21b is positioned on the apertures 15a to 15h defined in the rear of the main body 13 between the roll 21a and the cassette 22. A driven sprocket wheel 74, later to be described, comes in mesh with perforations 21c formed in the photo film 21. The rear of the apertures 15a to 15h constitutes the wide-vision format of 20×36 mm defining an aspect ratio of approximately 16/9, which is the same as used in the high definition television (HDTV).

The film 21 with the cassette 22 is of the 135 type (35 mm) defined by the International Standard Organization (ISO) 1007, 1979 version. A trailing end of the film 21 is secured to a spool 22a contained in the cassette 22.

On the top of the cassette chamber 20, a winding wheel 23 is disposed. A fork 23a is formed on the winding wheel 23 to be engaged with the spool 22a in the cassette 22. When the winding wheel 23 is rotated in the winding direction indicated by the arrow, the spool 22a rotates to wind the film 21 into the cassette 22 after exposure. The periphery of the winding wheel 23 is provided with teeth 23b. To prevent the winding wheel 23 from rotating in reverse to the film winding direction, a reversion preventing claw 24 is engaged with the teeth 23b, and consists of a springy plate.

The rear cover 14 is provided with a bottom lid 14a of a pull-top type, which is integral with the rear cover 14 and covers the bottom of the cassette chamber 20. When the lid 14a is opened, the cassette 22 having the exposed film 21 is removable from the cassette chamber 20. In the rear cover 14, there are formed an eyepiece 14b constituting a viewfinder and a slot 14c through which the winding wheel 23 partially appears.

In the front cover 11, there are formed openings 11a to 11h, through which a shutter release button 26, a finder objective window 27 and eight taking lenses 28a to 28h appear externally. The shutter release button 26 is defined by forming a crank-shaped slot in the top of the front cover 11, and depressed by a user's finger for triggering the shutter unit 12. When released from being depressed, the shutter release button 26 recovers the original position by the virtue of its resilient characteristic.

The shutter unit 12 is secured to the front of the main body 13 in removable fashion and via a structure having hooks. Eight taking lenses 28a to 28h are disposed on the front of the shutter unit 12. The taking lenses 28a to 28h have their optical axes which are directed substantially parallel with one another, and respectively pass the centers of the apertures 15a to 15h. The taking lenses 28a, 28b, 28e and 28f are formed integrally on a single lens plate 29. The taking lenses 28c, 28d, 28g and 28h are formed integrally on a second single lens plate 30. The lens plates 29 and 30 are formed from transparent resin, which typically may be acrylic resin. The shutter unit 12 also incorporates a viewfinder 31 including an eyepiece lens and an objective lens.

Figure 2:
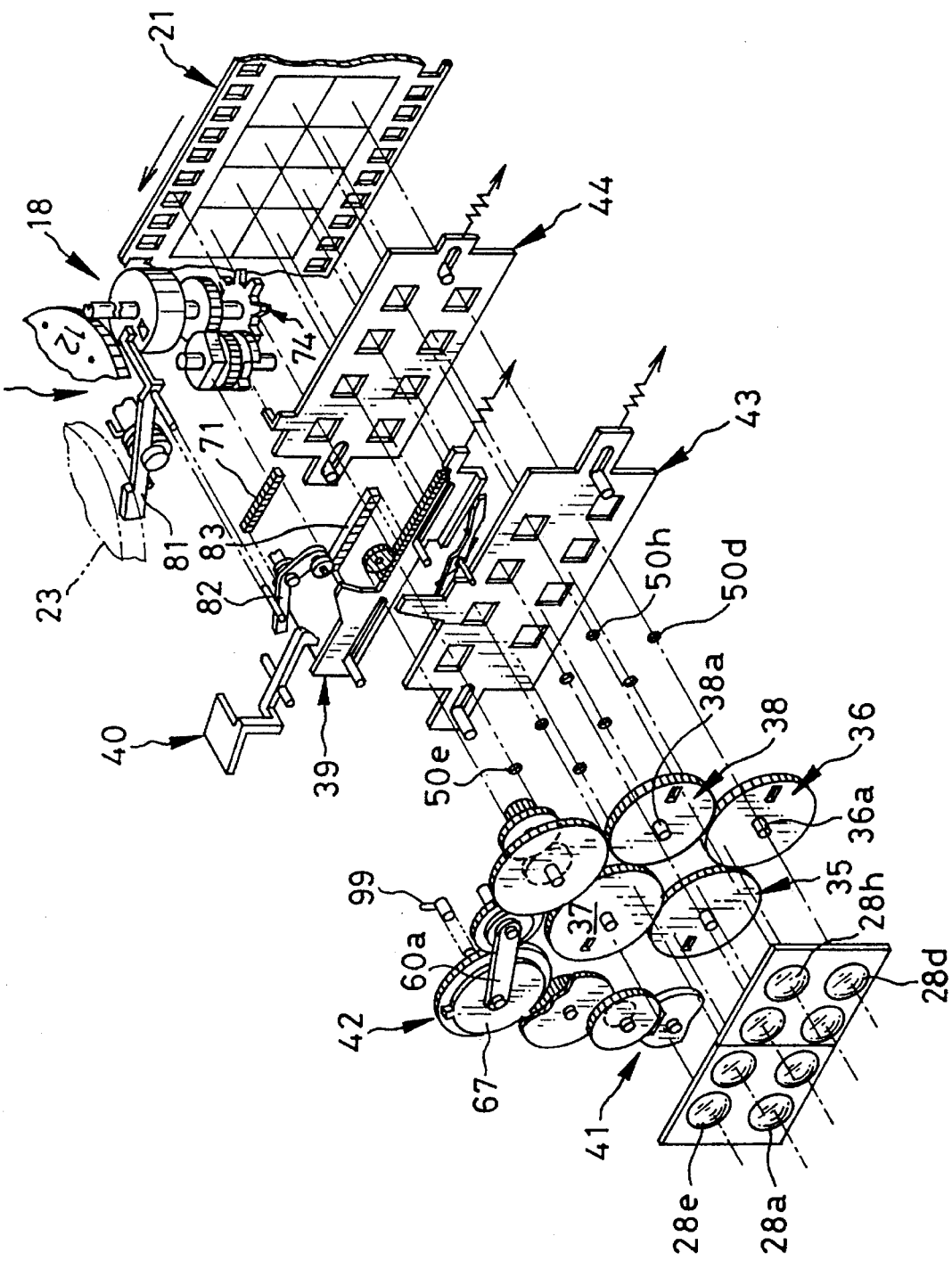
FIG. 2 is an exploded perspective view illustrating a shutter unit in the photo film unit in FIG. 1.
Figure 3:
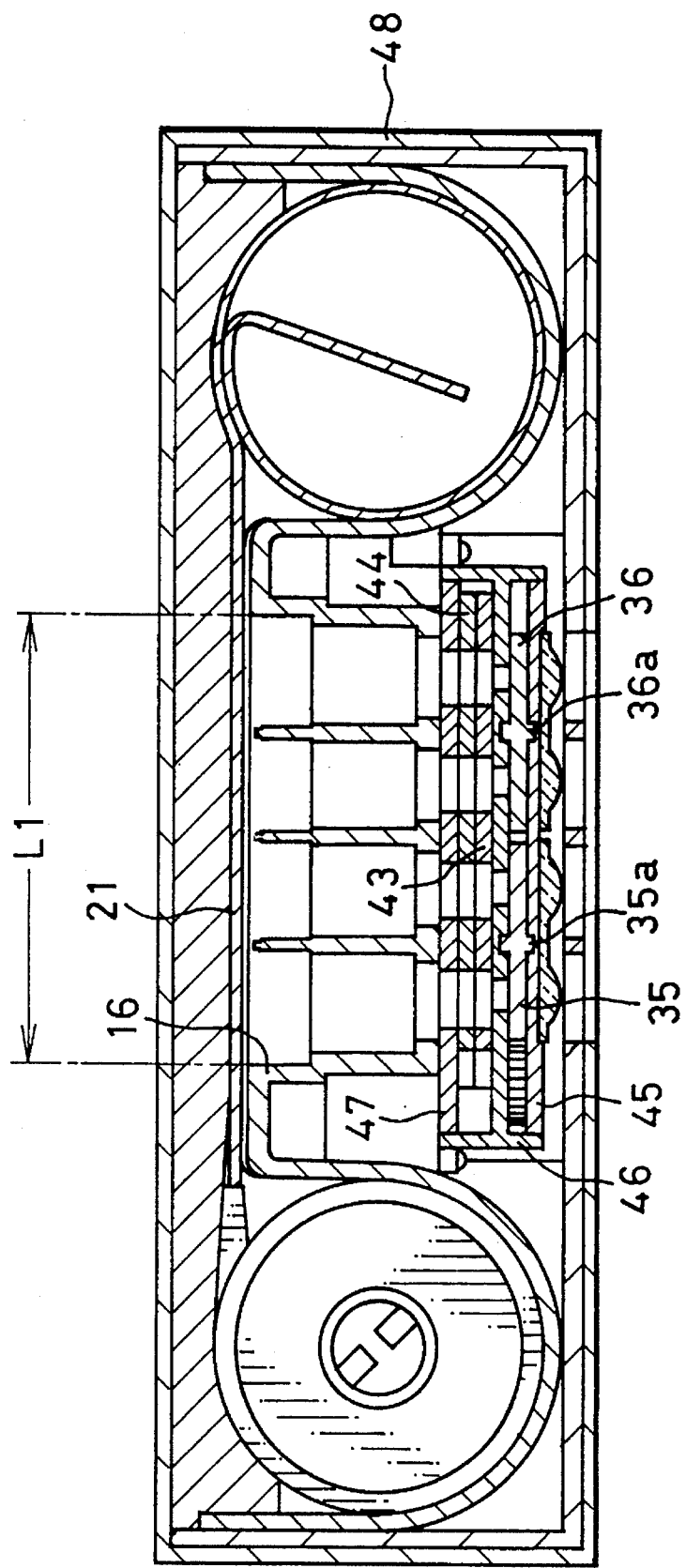
FIG. 3 is a horizontal section illustrating the photo film unit.
Figure 4:
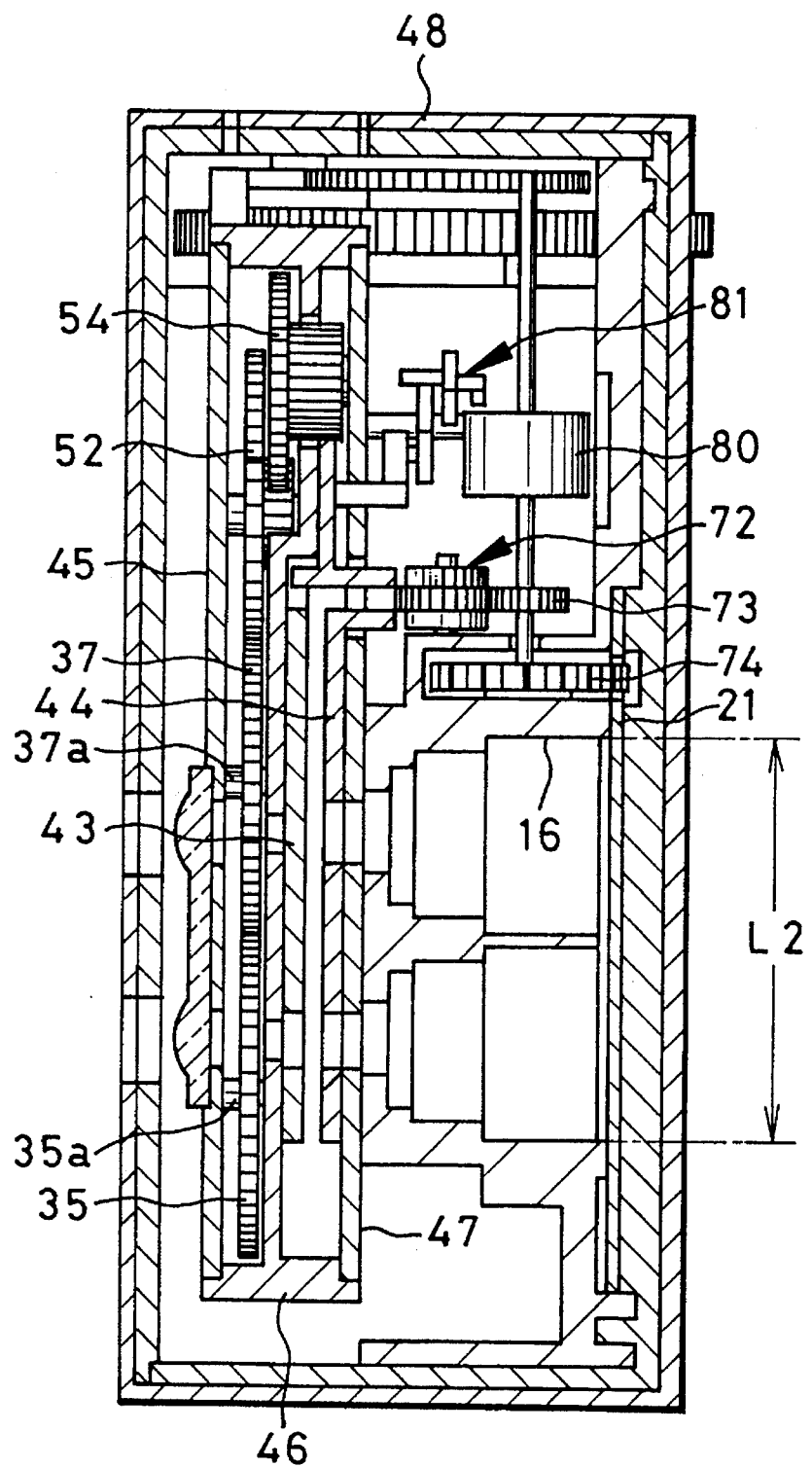
FIG. 4 is a cross section illustrating the photo film unit.

The shutter unit 12 is illustrated in detail in FIGS. 2 to 4. The shutter unit 12 is constituted of four shutter disks 35 to 38, a slide plate 39, a charge lock lever 40, a governor mechanism 41, a transmitting mechanism 42, a changeover plate 43, and a mask plate 44. All of those elements are contained in a gear box, either between a front plate 45 and a middle plate 46 or between the middle plate 46 and a rear plate 47. When secured to the main body 13, the shutter unit 12 is connected to the one-frame advance mechanism 17 and the film counter mechanism 18. In FIGS. 3 and 4, an external cardboard wrapper 48 is disposed around the photo film unit 10 to package it.

There are formed eight stationary openings 50a to 50h in the middle plate 46 to lie in the optical axes of the taking lenses 28a to 28h. The stationary openings 50a to 50h are adapted both as a stop aperture of a fixed stop and as a shutter aperture, and have an equal inner diameter. In front of the stationary openings 50a to 50h, there are arranged four shutter disks 35 to 38. The shutter disks 35 to 38 have rotational shafts 35a, 36a, 37a and 38a, which are supported in rotatable fashion on the front plate 45 and the middle plate 46. The shafts 37a and 38a as rotational centers of the shutter disks 37 and 38 are located above the upper four stationary openings 50e to 50h. The shaft 37a is equally distant from the stationary openings 50e and 50f. The shaft 38a is equally distant from the stationary openings 50g and 50h. The shafts 35a and 36a as rotational centers of the shutter disks 35 and 36 are located under the lower four stationary openings 50a to 50d. The shaft 35a is equally distant from the stationary openings 50a and 50b. The shaft 36a is equally distant from the stationary openings 50c and 50d.

The openings 50a and 50b are equally distant from the shaft 35a. The openings 50c and 50d are equally distant from the shaft 36a. The openings 50e and 50f are equally distant from the shaft 37a. The openings 50g and 50h are equally distant from the shaft 38a. Note that the front, middle and rear plates 45 to 47 are eliminated from FIG. 2 for the purpose of convenience in illustration.

Figure 5:
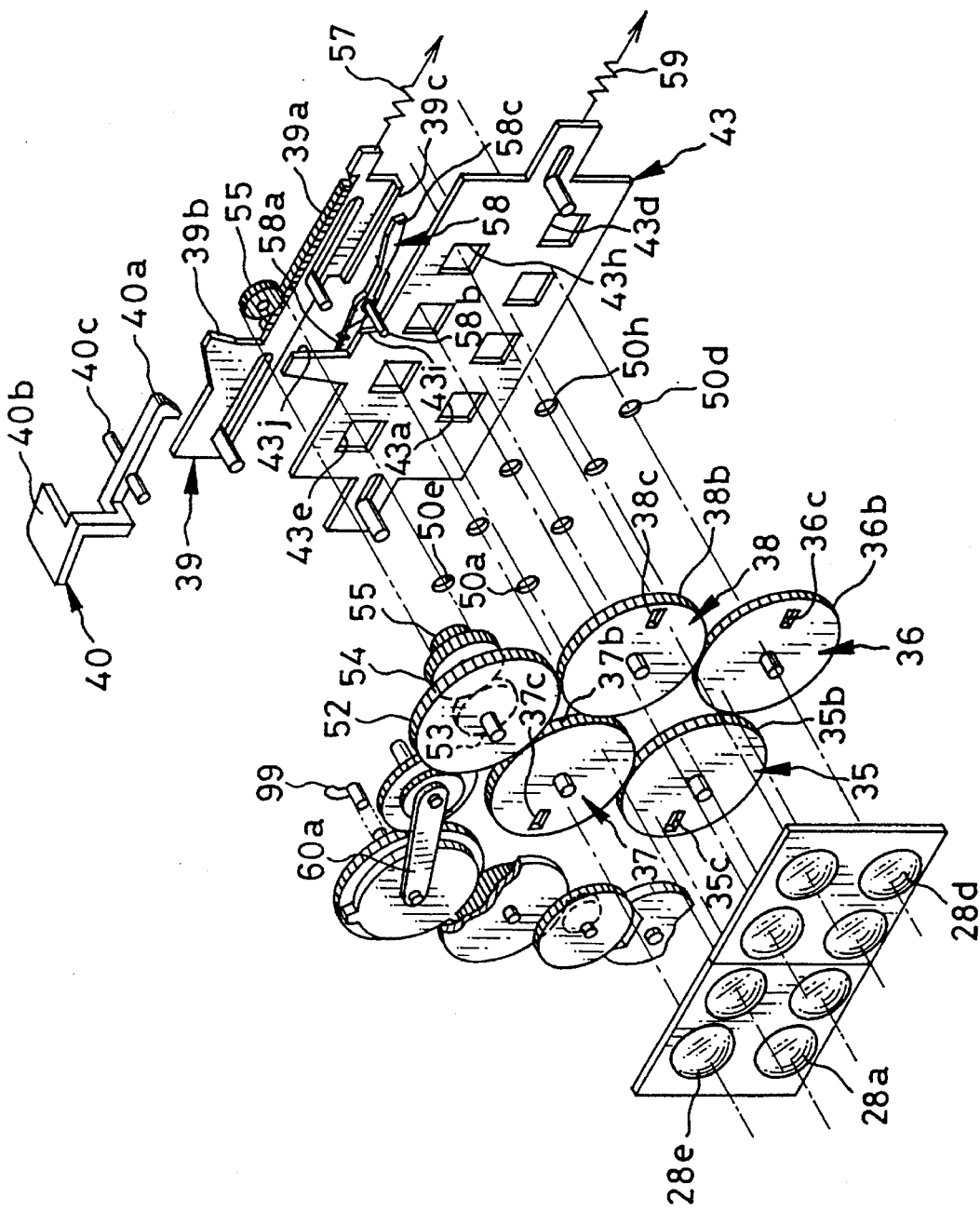
FIG. 5 is an exploded perspective view illustrating front-side components of the shutter unit.

As illustrated in FIG. 5, the periphery of the shutter disks 35 to 38 is provided with teeth 35b, 36b, 37b and 38b in an equal number. The teeth 35b is in mesh with the teeth 37b. The teeth 36b is in mesh with the teeth 38b. A toothed wheel 52 is in mesh with the two sets of teeth 37b and 38b, and have teeth in a number equal to that of the teeth 37b and 38b. A pinion 53 is fixed on the wheel 52 in coaxial fashion, and is in mesh with a toothed wheel 54. A pinion 55 is fixed on the wheel 54 in coaxial fashion, and is in mesh with a rack 39a formed on the slide plate 39.

The slide plate 39 is slidable in the direction of movement of the film 21, and biased by a releasing spring 57 in the direction toward the left of the camera. A released state of the slide plate 39 is present in FIG. 5, as the slide plate 39 has been moved fully in the releasing direction. The operation of the winding wheel 23 moves the slide plate 39 toward the left in the charging direction.

A charge lock lever 40 in the shutter unit 12 is disposed in the left of the slide plate 39. The charge lock lever 40 has a locking claw 40a on its one end, and a pressing plate 40b on its second end. A rotational shaft 40c of the charge lock lever 40 is supported in rotational fashion. The locking claw 40a is engaged with an engageable portion 39b, and retains the slide plate 39 in a charged position. The pressing plate 40b is located between the shutter release button 26 and the winding wheel 23, and is rotatable about the shaft 40c in response to operation of the shutter release button 26. The rotation of the pressing plate 40b disengages the locking claw 40a from the engageable portion 39b, and enables the releasing spring 57 to move the slide plate 39 toward the released position. In the course of the movement of the slide plate 39 from the charged position to the released position, the shutter disks 35 to 38 make two rotations simultaneously.

The shutter disks 35 to 38 are provided with respective single slits 35c to 38c. The slits 36c to 38c are away respectively from the associated shafts 36a to 38a at a distance equal to one at which the slit 35c is away from the shaft 35a. A length of the slits 35c to 38c is determined equal to or greater than an inner diameter of the stationary openings 50a to 50h. As the shutter disks 35 to 38 make two rotations, the slits 35c to 38c are passed two times in front of the stationary openings 50a to 50h. To be precise, the slits 35c and 36c open/close the stationary openings 50a, 50b, 50c and 50d in the order listed. The slits 37c and 38c open/close the stationary openings 50e, 50f, 50g and 50h in the order listed.

Under the slide plate 39 are disposed a changeover lever 58 and the changeover plate 43, which are adapted to changing over the exposures between the first and second rotations, in selective enabling of the upper stationary openings 50e to 50h and the lower stationary openings 50a to 50d. The changeover plate 43 is slidable behind the stationary openings 50a to 50h in the direction of moving the film 21, and is biased by a spring 59 in the direction the same as the releasing spring 57.

The changeover plate 43 is provided with four lower movable openings 43a to 43d which simultaneously enable the lower four stationary openings 50a to 50d, and four upper movable openings 43e to 43h which simultaneously enable the upper four stationary openings 50e to 50h. Horizontal intervals between each adjacent two of the movable openings 43a to 43h are equal. The changeover plate 43 is provided with a stepped recess 43i for receiving one end of the changeover lever 58, and a top projection 43j to be contacted on a bottom ridge 39c on the slide plate 39 when moved in the charging direction.

The changeover lever 58 is provided with a shaft 58b about which the changeover lever 58 is supported rotatably. The changeover lever 58 is biased counterclockwise in FIG. 5 by a spring. The one end 58a of the changeover lever 58 becomes engaged with the stepped recess 43i when the slide plate 39 stands in the charged position, to retain the changeover plate 43. The changeover plate 43 blocks the upper four stationary openings 50e to 50h, while the lower four movable openings 43a to 43d are superposed on the lower four stationary openings 50a to 50d.

An opposite end 58c of the changeover lever 58 comes in contact with an edge of the bottom ridge 39c as soon as the shutter disks 35 to 38 make one rotation together. The contact between the end 58c and the bottom ridge 39c causes the changeover lever 58 to rotate at a small amount clockwise about the shaft 58b, to disengage the one end 58a from the stepped recess 43i. Then the changeover plate 43 is moved to the right at a predetermined amount by the bias of the spring 59, to superpose the upper movable openings 43e to 43h on the upper stationary openings 50e to 50h. Simultaneously the lower stationary openings 50a to 50d are blocked by the changeover plate 43.

Figure 6:
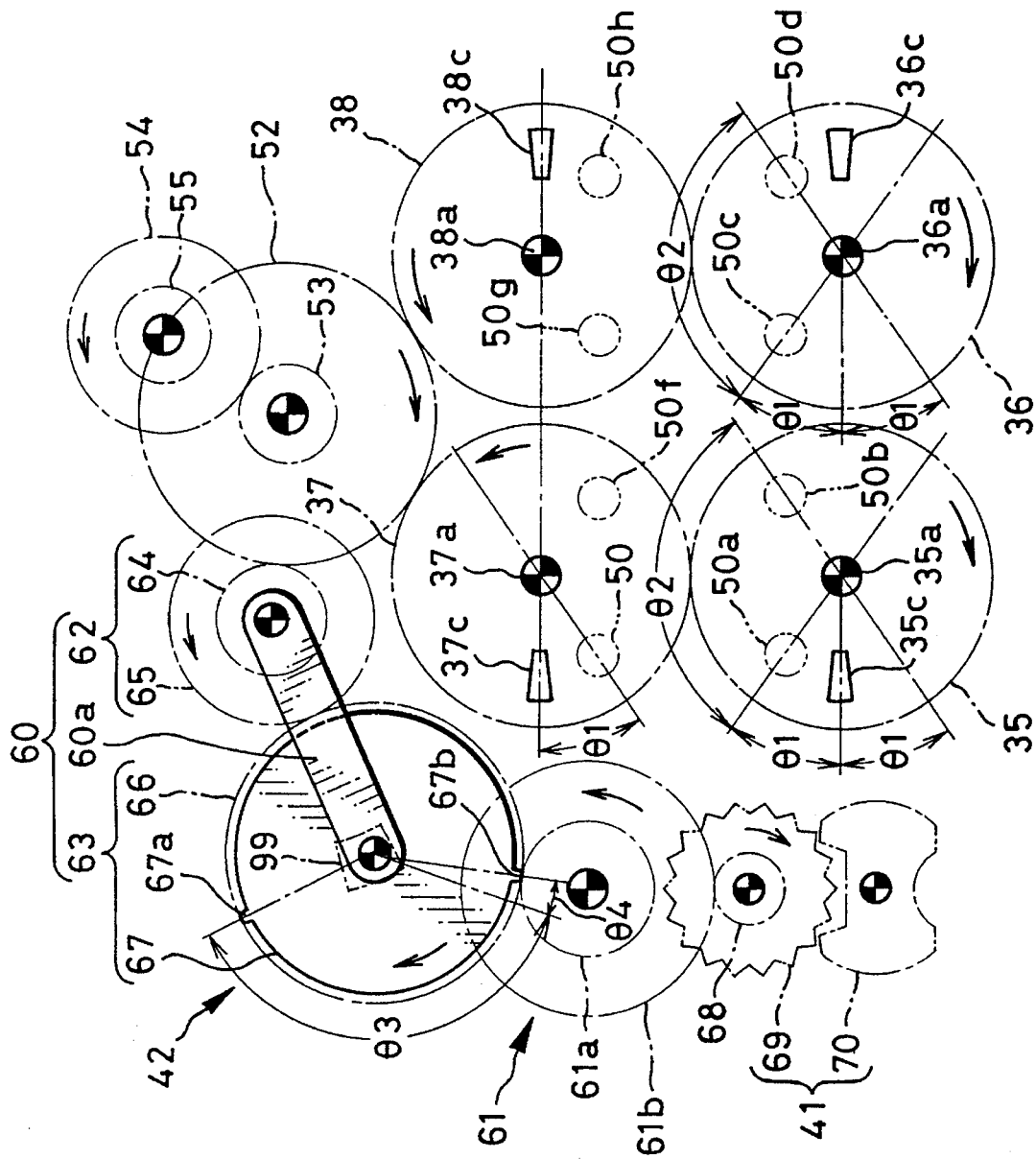
FIG. 6 is an explanatory view illustrating shutter disks and their relevant gearings.

As illustrated in FIG. 6, first to fourth exposures are effected after the movement of the changeover plate 43:

the first exposure in passing the slit 35c in front of the stationary opening 50a located in the angular position of $\theta_1$;

the second exposure in passing the slit 35c in front of the stationary opening 50b located in the angular position of $(\theta_1+\theta_2)$;

the third exposure in passing the slit 36c in front of the stationary opening 50c located in the angular position of $(3\times\theta_1+\theta_2)$, which is equal to $(\theta_1+180°)$; and the fourth exposure in passing the slit 36c in front of the stationary opening 50d located in the angular position of $(3\times\theta_1+2\times\theta_2)$, which is equal to $(\theta_1+\theta_2+180°)$.

The shutter disks 35 to 38 make further rotation at the angle of $\theta_1$. Then the second rotation starts. At the same time the changeover plate 43 is actuated to move to a second position. Fifth to eighth exposures are effected:

the fifth exposure in passing the slit 37c in front of the stationary opening 50e located in the angular position of $\theta_1$;

the sixth exposure in passing the slit 37c in front of the stationary opening 50f located in the angular position of $(\theta_1+\theta_2)$;

the seventh exposure in passing the slit 38c in front of the stationary opening 50g located in the angular position of $(3\times\theta_1+\theta_2)$, which is equal to $(\theta_1+180°)$; and the eighth exposure in passing the slit 38c in front of the stationary opening 50h located in the angular position of $(3\times\theta_1+2\times\theta_2)$, which is equal to $(\theta_1+\theta_2+180°)$.

In the present embodiment, respective durations of opening the stationary openings 50a to 50h by passage of the slits 35c to 38c are 1/250 second.

To the wheel 52, the transmitting mechanism 42 is connected for setting intervals between exposures to be longer than the respective exposures. The transmitting mechanism 42 is constituted of a planetary gear mechanism 60 and a double gear 61, and adapted to intermittent coupling of the shutter disks 35 to 38 to the governor mechanism 41. The planetary gear mechanism 60 is constituted of a sun gear 62, an arm 60a, and a planet gear 63, which is revolved about the sun gear 62 in the same direction as the sun gear 62 and simultaneously rotated about its center in the direction opposite to the sun gear 62. The sun gear 62 includes a pinion 64 in mesh with the wheel 52 and a toothed wheel 65 which is fixed on the pinion 64 and is in mesh with a toothed wheel 66 of the planet gear 63.

The planet gear 63 includes the wheel 66 and an intermittent toothed wheel 67, which are fixed on a common rotary shaft, and have a diameter equal to that of shutter disks 35 to 38. While the shutter disks 35 to 38 make one rotation, the wheel 66 and the intermittent toothed wheel 67 make two rotations. The intermittent toothed wheel 67 has only two teeth 67a and 67b, which are arranged at a rotational angle of θ3, and come in mesh with a toothed wheel 61a of the double gear 61 upon rotational movements at the given angles. The double gear 61 has a toothed wheel 61b in mesh with a pinion 68, on which an escapement 69 is fixed and constitutes the governor mechanism 41. A known anchor 70 is in mesh with the escapement 69, and sets the rotation of the shutter disks 35 to 38 at a low speed in response to the mesh of the intermittent toothed wheel 67 with the double gear 61.

The reduction of the speed is effected by the connection of the governor mechanism 41 with the disks 35 to 38 when the wheel 61a is in mesh with either tooth 67a, 67b on the intermittent toothed wheel 67. In the present embodiment, the stationary openings 50a to 50h are so formed that the angle (2×θ1) is 74 degrees and that the angle θ2 is 106 degrees, both with reference to the shafts 35a to 38a. Accordingly, an angle θ3 defined between the two teeth 67a and 67b is so determined that rotation of the shutter disks 35 and 38 at the amounts of 74 degrees and 106 degrees engages the teeth 67a and 67b with the wheel 61a.

In considering that the intermittent toothed wheel 67 makes two rotations during one rotation of the shutter disks 35 to 38, the angle θ3 between the two teeth 67a and 67b can be determined as 2×74=148 (degrees).

Then the governor mechanism 41 is reliably connected for speed reduction during the intervals between exposures. The exposure time of each of the exposures is kept equal, because each slit 35c, 36c, 37c, 38c with its associated stationary opening 50a to 50h defines a constantly equal angle at the time upon the release of the governor mechanism 41.

The tooth 67a of the intermittent toothed wheel 67 is on the point of rotating away from the wheel 61a, and has the rotational position at the angle θ4 clockwise from its initial engaging position with the wheel 61a. When the slide plate 39 moves in the charging direction, the sun gear 62 rotates clockwise in reverse to the arrow direction in FIG. 6, to revolve the planet gear 63 about the sun gear 62 and in the same direction. With the intermittent toothed wheel 67 detached from the wheel 61a, the governor mechanism 41 is disabled from reducing the speed.

Figure 7:
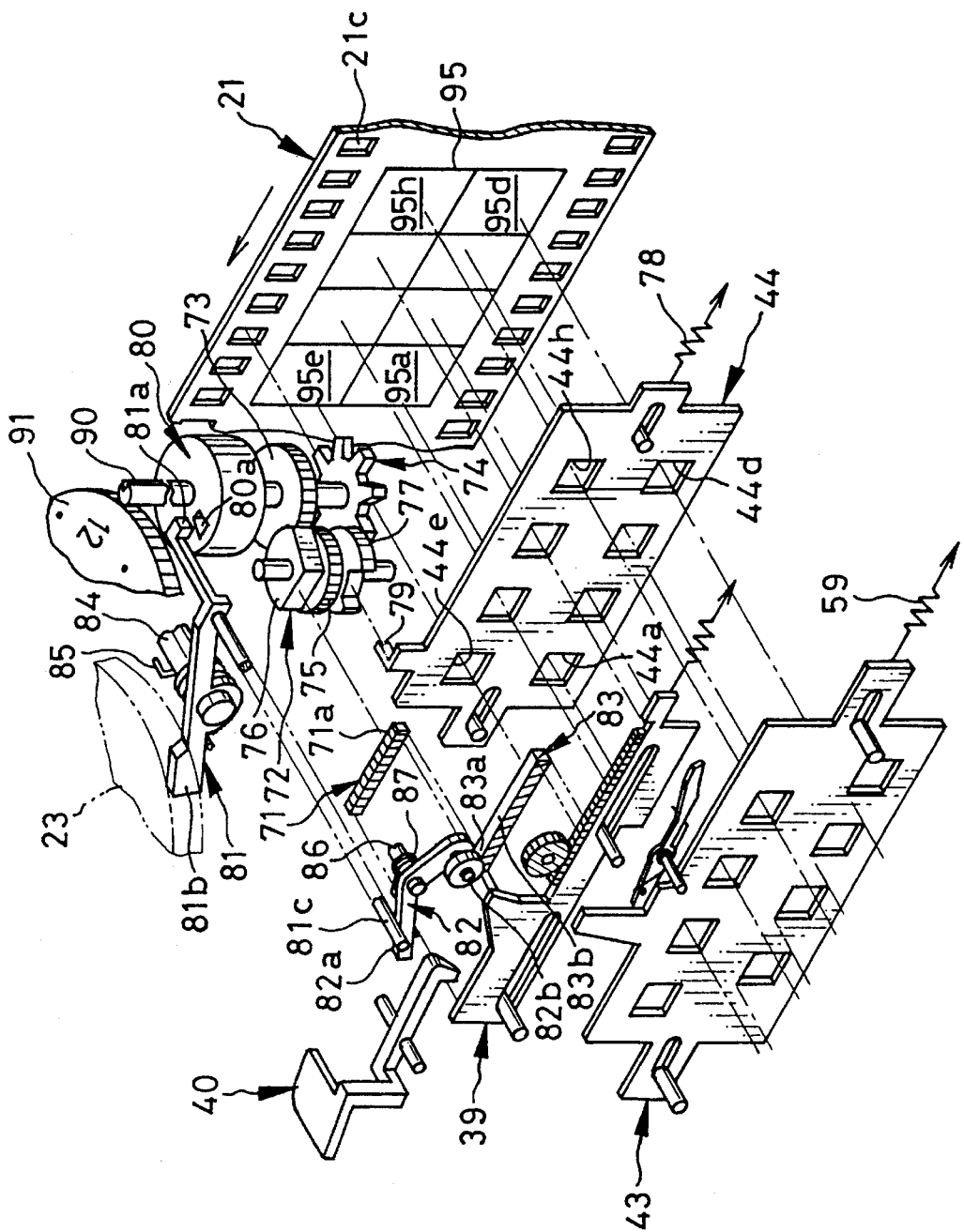
FIG. 7 is an exploded perspective view illustrating rear-side components of the shutter unit.
Figure 8:
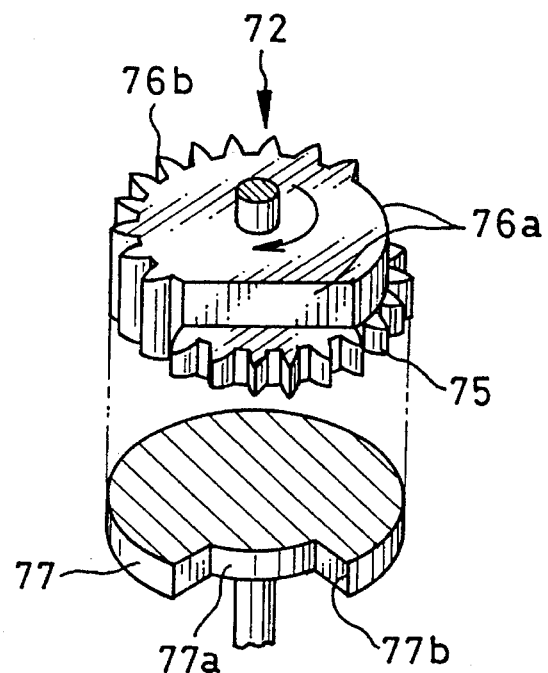
FIG. 8 is a perspective view illustrating a triple gear connected to the shutter unit.

The slide plate 39, to be precise in FIG. 7, is provided with a second rack 71 formed on its rear. A charge mechanism for moving the slide plate 39 to a charged position is constituted of the second rack 71, a triple gear 72, a toothed wheel 73 and the driven sprocket wheel 74. As illustrated in FIG. 8, the triple gear 72 includes a toothed wheel 75, a recessed wheel 76 and a recessed cam disk 77 in all integral fashion. The wheel 75 is in mesh with the wheel 73 co-axially fixed on the sprocket wheel 74, and driven by the sprocket wheel 74 when rotated.

The recessed wheel 76 has a cutout 76a and a toothed portion 76b, which is in mesh with the second rack 71, and when rotated, moves the slide plate 39 in the charging direction. The cam disk 77 has a partial recess 77a, which is adapted to movement of the mask plate 44 toward the blocking position where the stationary openings 50a to 50h are fully blocked. The cutout 76a causes the slide plate 39 to remain in the released position without shifting in the charging direction before the mask plate 44 comes to the blocking position. Immediately upon the mask plate 44 moves to the blocking position, the second rack 71 comes in mesh with the toothed portion 76b.

As is well known in the art of camera, the sprocket wheel 74 has eight teeth thereabout. When the sprocket wheel 74 makes one rotation, the film 21 is moved as far as one frame, while the triple gear 72 caused to make one rotation. The second rack 71 has a toothless portion 71a nearly as great as one tooth in a position in advance of the initial mesh with the charging toothed portion 76b. The toothless portion 71a prevents the charging toothed portion 76b and the second rack 71 from being disengaged from one another.

The slide plate 39, upon one rotation of the sprocket wheel 74, moves beyond the charged position at a small amount. Upon one rotation of the triple gear 72, the cutout 76a confronts the second rack 71, which is disengaged from the toothed portion 76b. The slide plate 39 is moved in the releasing direction to a small extent, before being locked by the charge lock lever 40 in the charged position.

Before the slide plate 39 moves to the charged position, the shutter disks 35 to 38 rotate. The stationary openings 50a to 50h are masked by the mask plate 44. The mask plate 44 is slidable in the direction of moving the film 21, and biased by an opener spring 78 to the right as viewed. The mask plate 44 has auxiliary movable openings 44a to 44h for enabling the stationary openings 50a to 50h, and an L-shaped cam follower projection 79 on the upside.

Figure 9:
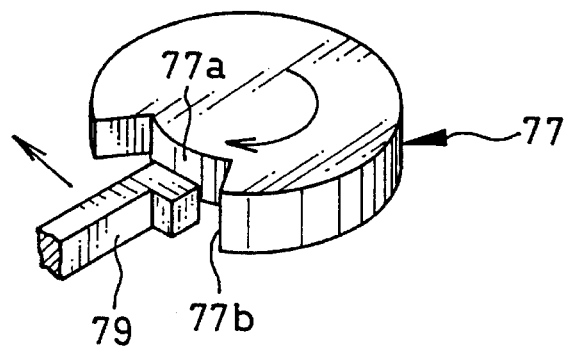
FIG. 9 is an explanatory view illustrating arrangement of a recessed disk and a cam follower projection.

The cam follower projection 79, as illustrated in FIG. 9, confronts the recess 77a in the recessed disk 77, which rotates to cause a wall 77b inside the recess 77a to press the cam follower projection 79, which is moved to the left as viewed in FIG. 9. The movement of the cam follower projection 79, in FIG. 10, moves the mask plate 44 to the totally blocking position. The cam follower projection 79 remains in contact with the periphery of the recessed disk 77, and is kept in the totally blocking position until the end of one rotation of the recessed disk 77.

The one-frame advance mechanism 17 is constituted of a regulating disk 80, a retaining lever 81, a drive lever 82 and a cam surface 83. The regulating disk 80 is formed coaxially with the sprocket wheel 74, and has a receiving hole 80a. The retaining lever 81 is disposed rotatably with respect to a shaft 84, which is parallel with the optical axes. A spring 85 biases the retaining lever 81 clockwise. One end of the retaining lever 81 is provided with a retaining claw 81a projected to the rear.

The retaining claw 81a is rotatable between a locking position inserted in the receiving hole 80a and a retracted position away from the receiving hole 80a. A ridge 81b is formed on a second distal end of the retaining lever 81. When the retaining claw 81a is in the locking position, the ridge 81b is swung to retain the bottom of the winding wheel 23, so as to stop the wheel 23 from being rotated by the user of the camera. A connective rod 81c is formed to extend from the retaining claw 81a, and contacts an end 82a of the drive lever 82.

The drive lever 82 is disposed rotatably about a shaft 86 parallel to the optical axes, and is biased clockwise by a spring 87. A second end of the drive lever 82 has a rotatable roller 82b, which is in contact with the cam surface 83. The cam surface 83 is formed integrally with the rear of the slide plate 39, and consists of a slant face 83a and a flat face 83b. The slant face 83a is contacted on the roller 82b when the slide plate 39 is in the released position, to rotate the retaining lever 81 to a position where the retaining claw 81a is retracted. The flat face 83b is contacted on the roller 82b when the slide plate 39 is away from the released position toward the charged position, to rotate the retaining lever 81 to a position where the retaining claw 81a is locked.

Note that the film counter mechanism 18 is constituted of a one-toothed gear portion 90 fixed on the sprocket wheel 74, and a counter wheel 91, which is in mesh with the one-toothed gear portion 90 and indicates the number of imaging frames.

As illustrated in FIG. 3, the horizontal length L1 of the rear of the exposure tunnel 16 is 36 mm, which is equal to a horizontal length of a single imaging frame of the 35 mm full size. As illustrated in FIG. 4, the vertical width L2 of the rear of the exposure tunnel 16 is approximately 20 mm, which is smaller than a vertical range of the imaging frame of the 35 mm full size. When a photograph is taken through the exposure tunnel 16, eight consecutive picture sub-frames 95a to 95h are created in two row and four columns, within a single frame 95 as illustrated in FIG. 7. The single frame 95 has the wide-vision format of approximately 16/9, which is the same as used in the high definition television. Note that the exposure tunnel 16 is so formed that the horizontal range of the sub-frames 95a, 95d, 95e and 95h is longer than that of the other sub-frames 95b, 95c, 95f and 95g. This is because a negative film masking device in a photo printer is to be placed on the frame 95 to shorten its horizontal range when printed. The eight consecutive images on a photographic print when finished can have respective horizontal ranges unchanged between one another.

The operation of the above construction is described now. The shutter unit 12 has the initial condition as illustrated in FIG. 2. In this condition, the slits 35c and 37c in the shutter disks 35 and 37 are placed to be level with the axes 35a and 37a respectively. The slits 36c and 38c in the shutter disks 36 and 38 are placed opposite rotationally, namely at a flat angle with reference to from the slits 35c and 37c. The stationary openings 50a and 50h are blocked by the shutter disks 35 to 38. The slide plate 39 has the released position.

As illustrated in FIG. 5, the changeover plate 43 blocks the stationary openings 50a to 50d and has the movable openings 43e to 43h superposed on the stationary opening 50e to 50h. The mask plate 44, in FIG. 7, is so located as to superpose the auxiliary movable openings 44a to 44h on the stationary openings 50a to 50h. In the one-frame advance mechanism 17, the roller 82b is located on the slant face 83a of the cam surface 83, to locate the retaining claw 81a in its retracted position. The winding wheel 23 therefore is allowed to rotate for winding the film 21.

When the winding wheel 23 is operated, the film 21 is wound into the cassette 22 at an amount of one frame. The movement of the film 21 rotates the driven sprocket wheel 74 in mesh with the perforations 21c in the counterclockwise direction in FIG. 7. The rotation of the sprocket wheel 74 is transmitted by the wheel 73 to the wheel 75 of the triple gear 72, to rotate the triple gear 72 clockwise in the same drawing.

The rotation of the triple gear 72 causes the wall 77b of the recessed cam disk 77 to drive the cam follower projection 79, so as to move the mask plate 44 toward the blocking position. The auxiliary movable openings 44a to 44h are moved away from the optical axes through the taking lenses 28a to 28h, to close all of the stationary openings 50a to 50h. The charging toothed portion 76b of the recessed wheel 76 has not yet been engaged with the second rack 71. The slide plate 39 has not been moved toward the charged position.

Figure 10:
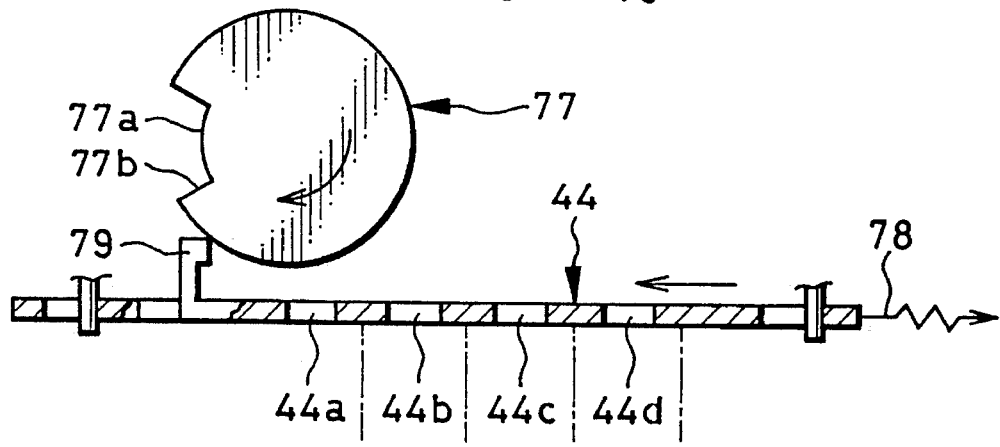
FIG. 10 is an explanatory view illustrating a process of moving a mask plate.

When the mask plate 44 is moved to the blocking position, the cam follower projection 79 is released from the wall 77b, and come in contact with the outer periphery of the cam disk 77, as illustrated in FIG. 10. In the course of the clockwise rotation of the cam disk 77, the mask plate 44 is retained in the blocking position.

Figure 11:
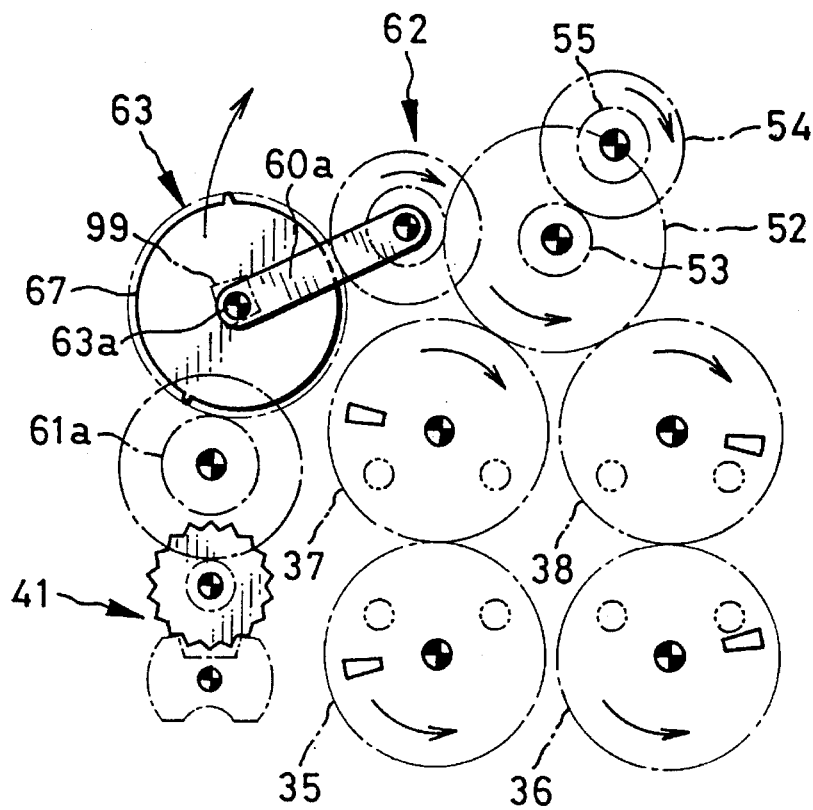
FIG. 11 is an explanatory view illustrating an initial state in rotation of the shutter disks.
Figure 12:
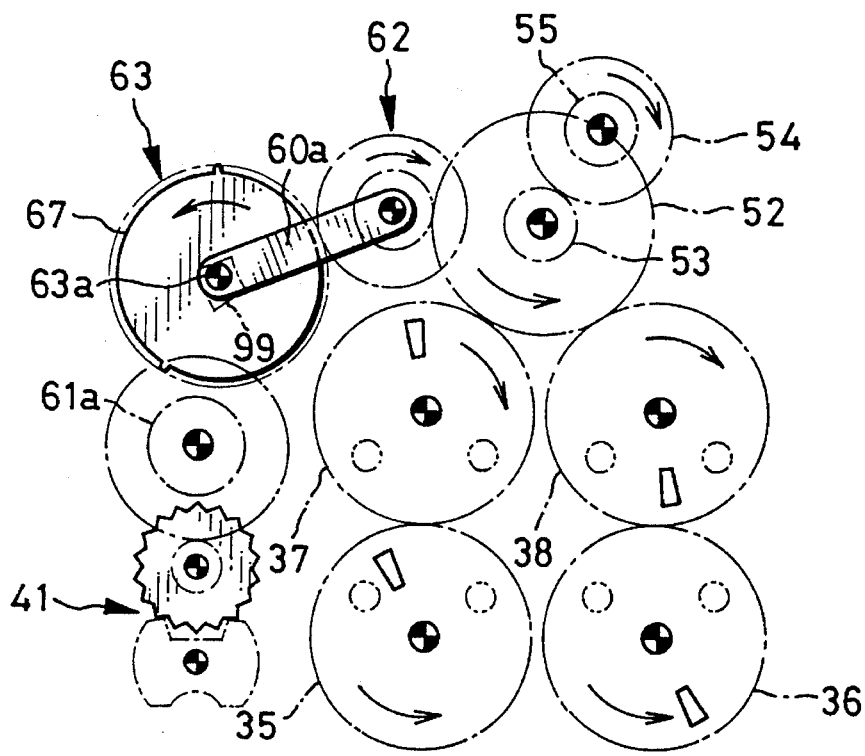
FIG. 12 is an explanatory view illustrating a state of the shutter disks during the film winding operation.

Further operation of winding the film 21 rotates the triple gear 72 and brings the charging toothed portion 76b in mesh with the second rack 71. Then the slide plate 39 starts being moved toward the charged position. The shutter disks 35 to 38 are rotated in the arrow directions in FIG. 11 by the wheels 52, 54 and the pinions 53, 55 with the first rack 39a. The sun gear 62 is rotated clockwise by the pinion 53. The planet gear 63 is revolved about the sun gear 62 in the clockwise direction. As illustrated in FIG. 12, the wheel 61a is separated from the intermittent toothed wheel 67. Therefore the winding wheel 23 can be rotated smoothly without resistance of the governor mechanism 41. Note that a slot 99 in the middle plate 46 limits the revolution of the planet gear 93. A swingable shaft 63a of the planet gear 63 is inserted through a slot 99, and is contacted on an upper distal end of the inside of the slot 99.

Figure 13:
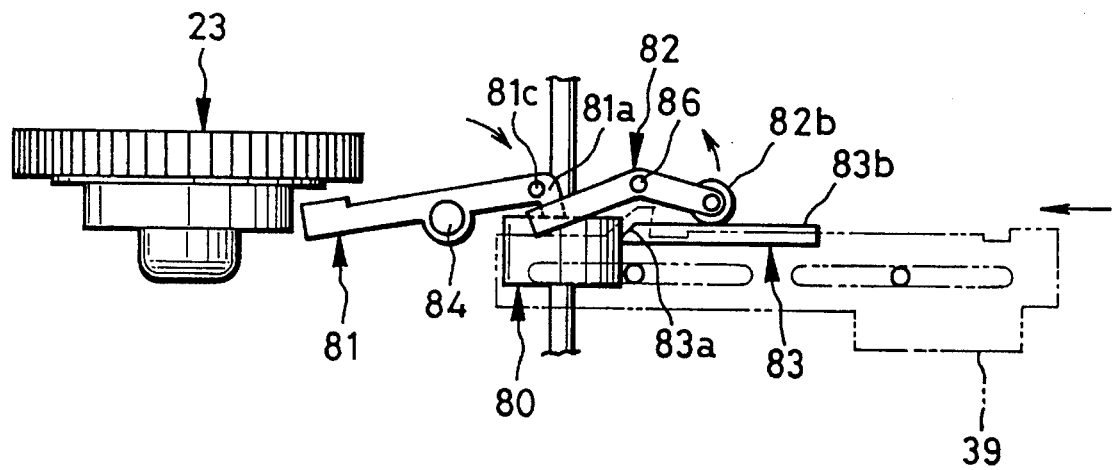
FIG. 13 is an explanatory view illustrating a one-frame advance mechanism moved during the shutter charging.
Figure 14:
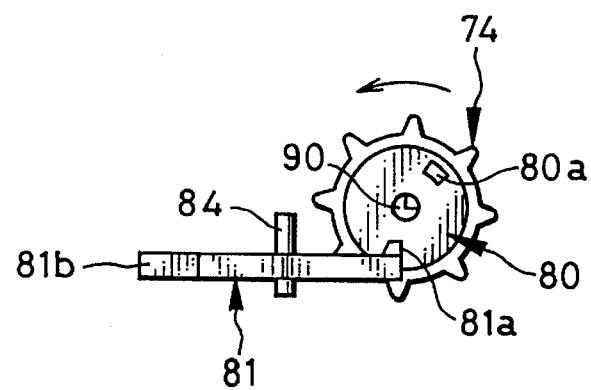
FIG. 14 is a plan view illustrating a regulating disk rotating in contact with a retaining claw.

As illustrated in FIG. 13, the movement of the slide plate 39 in the charging direction moves the cam surface 83. The roller 82b is shifted from the slant face 83a to the flat face 83b. The drive lever 82 is rotated counterclockwise about the axis 86. The retaining lever 81 is rotated clockwise about the axis 84 by the bias of the spring 85. The retaining claw 81a is rotated toward the locking position. In the meantime, the retaining claw 81a is kept from entering the receiving hole 80a in the regulating disk 80 which is rotating with the sprocket wheel 74. As illustrated in FIG. 14, the retaining claw 81a is contacted on the face of the regulating disk 80. The operation of the winding the film 21, therefore, is still enabled.

Figure 15:
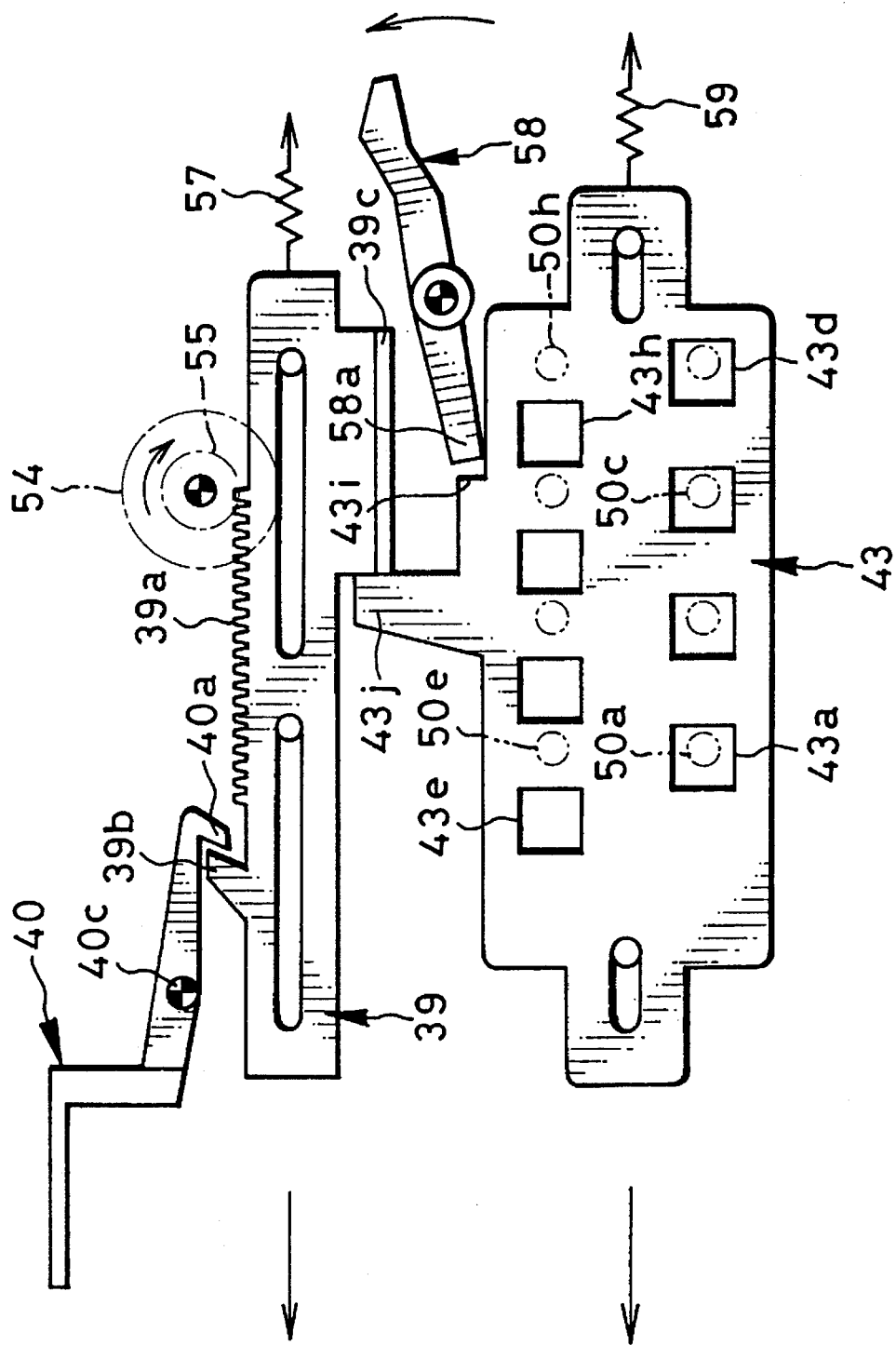
FIG. 15 is an explanatory view illustrating a slide plate and a changeover plate both in motion in the shutter charging.

Further operation of winding the film 21 brings the bottom ridge 39c in contact with the top projection 43j of the changeover plate 43. The slide plate 39 moves the changeover plate 43 in its moving direction. The engageable portion 39b contacts the locking claw 40a of the charge lock lever 40. Contacted faces of the engageable portion 39b and the locking claw 40a are both slant and do not block, but guide, the movement of the engageable portion 39b. Then the charge lock lever 40 is swung counterclockwise about the shaft 40c. The locking claw 40a is pushed away by the engageable portion 39b. The slide plate 39 is moved in the charging direction, until, as illustrated in FIG. 15, the slide plate 39 comes to a position somewhat farther than the charged position.

While the film 21 is wound as far as one frame, the sprocket wheel 74 makes one rotation. The retaining claw 81a enters the receiving hole 80a in the regulating disk 80, and stops the sprocket wheel 74 from being rotated. The ridge 81b on the retaining lever 81 is engaged with the underside of the winding wheel 23, and keeps the winding wheel 23 from being rotated.

When the sprocket wheel 74 makes one rotation, the triple gear 72 makes one rotation. The cam follower projection 79, having contacted on the peripheral portion on the recessed cam disk 77, enters the recess 77a. The mask plate 44 is moved to the right by the opener spring 78 and recovers the initial state. The auxiliary movable openings 44a to 44h are laid on the optical axes 28a to 28h, to open the stationary openings 50a to 50h.

When the sprocket wheel 74 makes one rotation, the cutout 76a confronts the second rack 71. The charging toothed portion 76b is disengaged from the second rack 71. The slide plate 39 is moved to the right at a small amount, and locked by the charge lock lever 40 in the charged state. The end 58a of the changeover lever 58 comes into the stepped recess 43i in the changeover plate 43, and retains the changeover plate 43 in the state of FIG. 16. The lower four movable openings 43a to 43d are superposed on the lower four stationary opening 50a to 50d, while the changeover plate 43 blocks the upper four stationary openings 50e to 50h.

Figure 17:
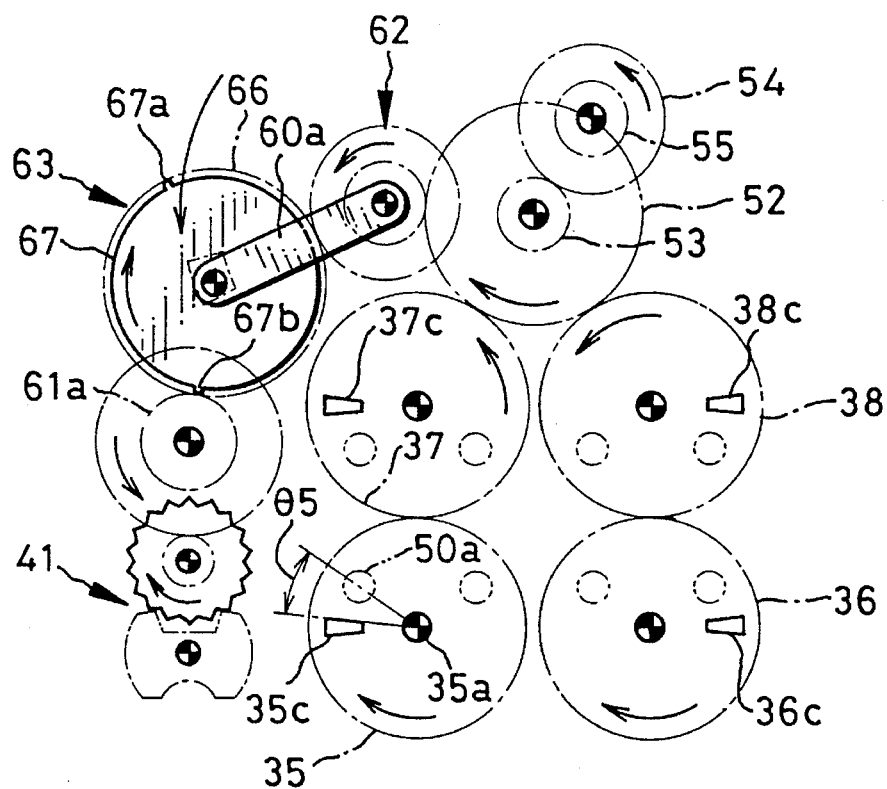
FIG. 17 is an explanatory view illustrating a state of the shutter disks after the shutter charging.

When the slide plate 39 moves to the right at a small amount, the sun gear 62 is rotated counterclockwise, as illustrated in FIG. 17, to revolve the planet gear 63 about the sun gear 62 in the counterclockwise direction. When the slide plate 39 is locked in the charged position, the planet gear 63 is positioned to contact the wheel 61a. The intermittent toothed wheel 67, as in FIG. 6, has such a position that the tooth 67a is about to move away from the wheel 61a.

The shutter disks 35 to 38 are stopped after making two rotations in charging the slide plate 39. As illustrated in FIG. 17, the shutter disk 35 in the stopped state has a rotational position such that an advancing edge of the slit 35c defines an angle θ5 from the center of the stationary opening 50a.

Figure 16:
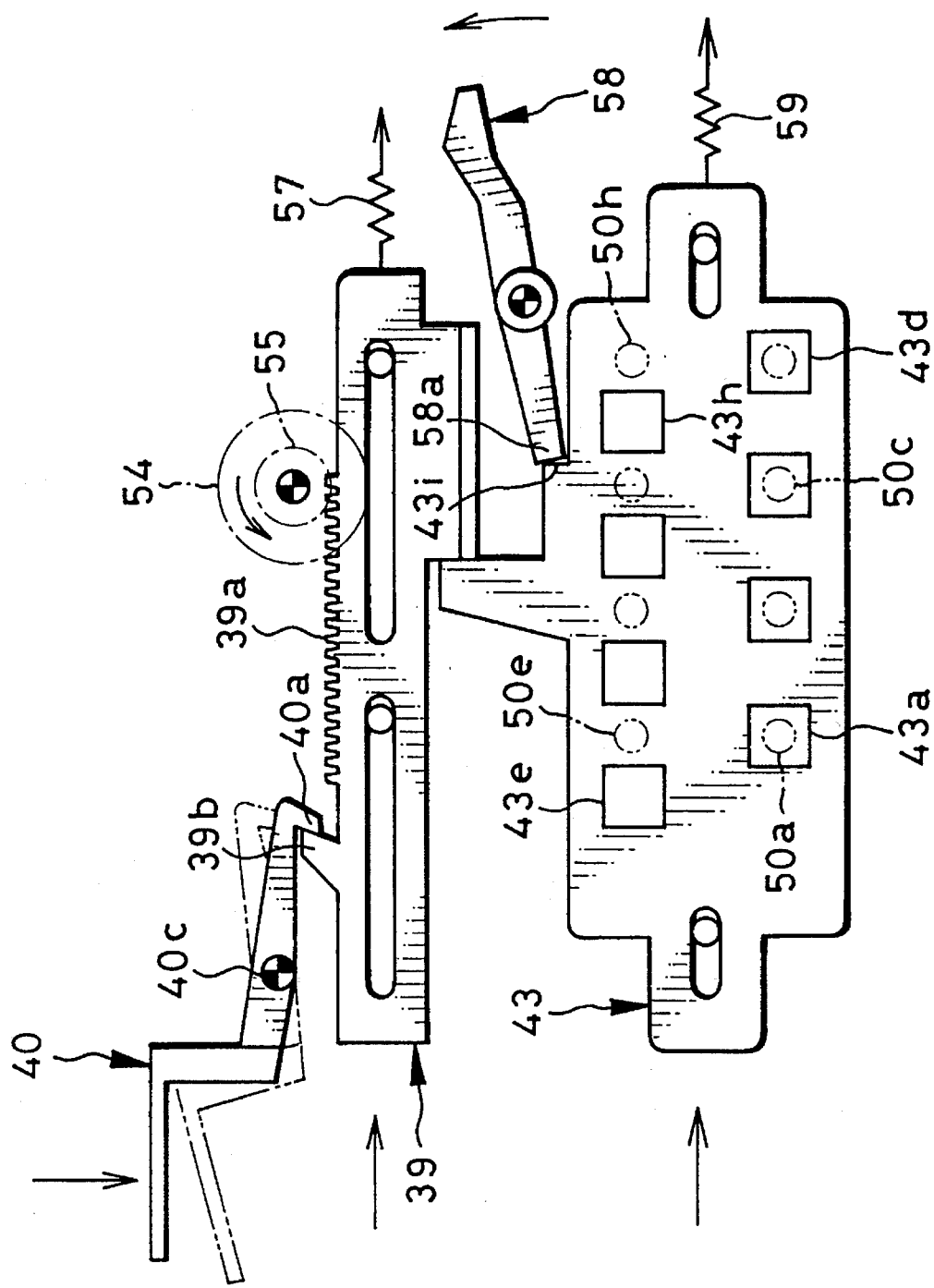
FIG. 16 is an explanatory view illustrating the slide plate and the changeover plate with the shutter charged.

A user of the consecutive taking camera observes a photographic subject through the eyepiece 14b to target it. The shutter release button is depressed when the subject is on the point of starting movement to be photographed, e.g. a golf player holds his club in the top position at the end of the back-swinging movement. Upon the release of the shutter, the charge lock lever 40 rotates counterclockwise about the shaft 40c as illustrated in FIG. 16. The locking claw 40a is disengaged from the engageable portion 39a of the slide plate 39, which is moved to the right by the bias of the releasing spring 57. The locking claw 40a and the engageable portion 39a have mutual contact faces shaped in arcs of which the shaft 40c is the center, so that the position of starting the movement of the slide plate 39 is unchanged irrespective of the velocity in depressing the shutter release button 26.

The movement of the slide plate 39 causes the first rack 39a, the pinions 53, 55, and the wheels 52, 54 to rotate the shutter disks 35 to 38 in synchronism in the arrow directions in FIG. 6. The planet gear 63 is also rotated via the pinion 53 and the sun gear 62. The tooth 67b on the intermittent toothed wheel 67 is not in mesh with the wheel 61a. The governor mechanism 41 is uncoupled from and released from the shutter disks 35 to 38.

Figure 18:
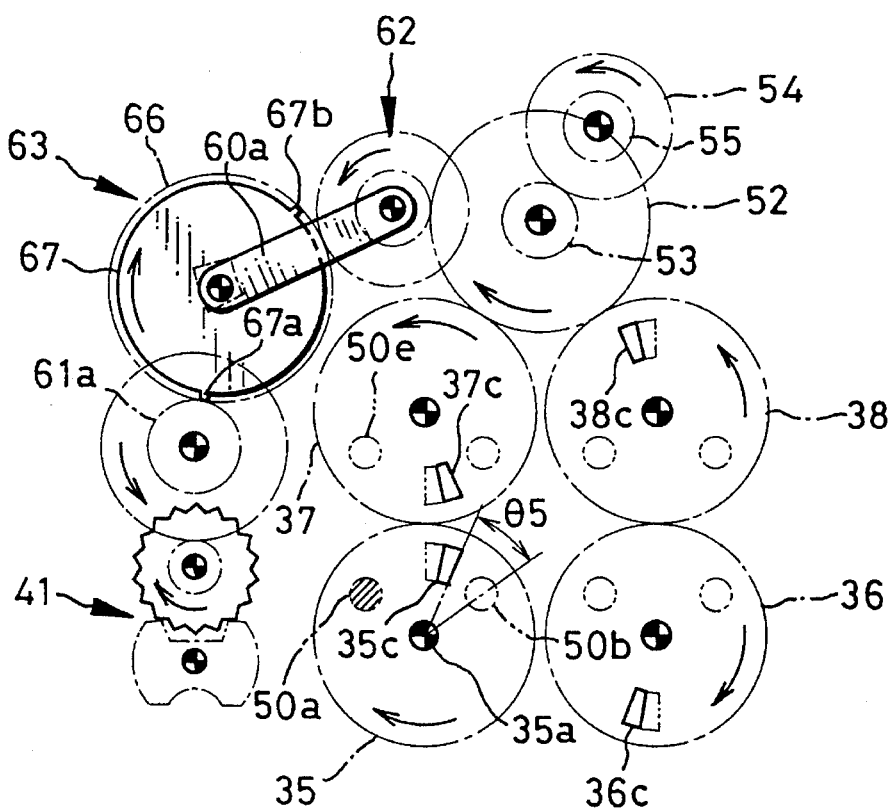
FIG. 18 is an explanatory view illustrating a state of the shutter disks immediately after a first exposure.

Until the time T1, the shutter disks 35 to 38 in FIG. 18 rotate to locate the slits 35c to 38c in the positions of the two-dot-chain lines. Prior to the time T1, the rotation causes the slit 35c to pass in front of the stationary opening 50a, and to effect a first exposure. At the same time, the slit 37c passes in front of the stationary opening 50e, but does not effect any exposure, because the stationary openings 50e to 50h stand closed by the changeover plate 43.

Figure 19:
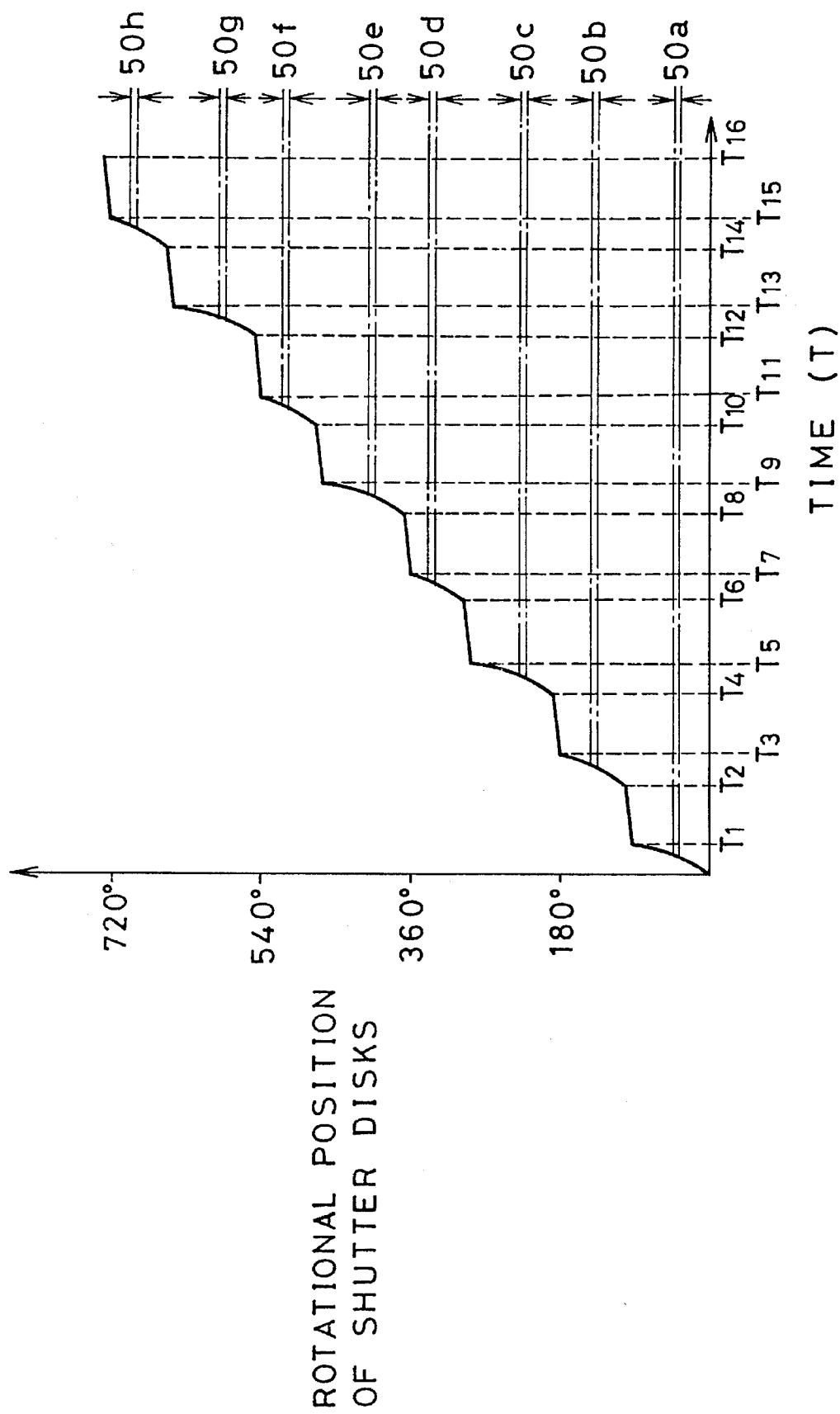
FIG. 19 is a graph illustrating a rotational position of the shutter disks relative to time.

As illustrated in FIG. 19, the tooth 67a of the intermittent toothed wheel 67 comes in mesh with the wheel 61a. When a tip of the tooth 67a abuts on a tip of one tooth of the wheel 61a, both the intermittent toothed wheel 67 and the wheel 61a might be likely to be stopped from rotating by the abutment between them. However the intermittent toothed wheel 67 constitutes the planet gear 63, which is caused by the wheel 61a abutting on the tooth 67a to revolve about the sun gear 62 at a small amount clockwise. Therefore the intermittent toothed wheel 67 and the wheel 61a are prevented from stopping rotating by the virtue of the revolution of the intermittent toothed wheel 67. Note that it is advantageous to shape the teeth of the wheel 61a in cycloid curves of which tips of the teeth define an acute angle, as this can smoothen the rotation of the intermittent toothed wheel 67 and the wheel 61a.

Upon engagement of the tooth 67a with the wheel 61a, the shutter disks 35 to 38 are coupled with the governor mechanism 41, which stabilizes the rotation of the shutter disks 35 to 38 at a low speed. At the time T2, the tooth 67a is disengaged from the wheel 61a. The shutter disks 35 to 38 in FIG. 18 come to locate the slits 35c to 38c in the positions of the solid lines. As illustrated in FIG. 18, the shutter disk 35 has a rotational position such that the advancing edge of the slit 35c defines the angle θ5 from the center of the stationary opening 50b. The shutter unit 12 stands by for the second exposure which is to have a duration of exposure time equal to the first exposure.

Figure 20:
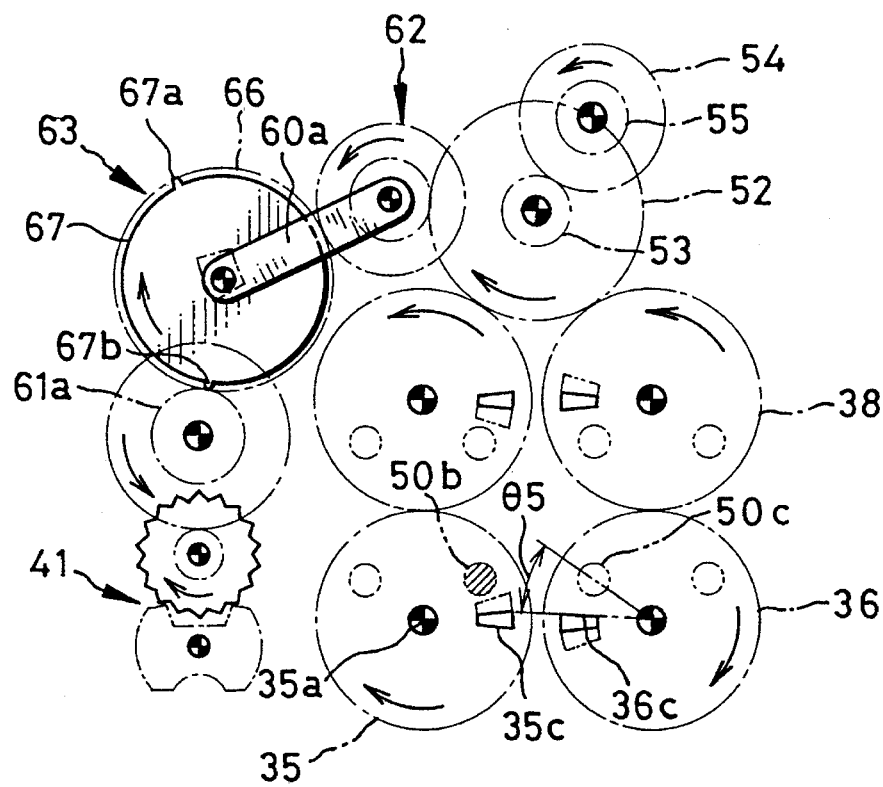
FIGS. 20 to 22 are explanatory views illustrating states of the shutter disks immediately after second, third and fourth exposures respectively.

Upon the time T2, the shutter disks 35 to 38 rotate at the high speed. The rotation causes the slit 35c to pass in front of the stationary opening 50b, and to effect the second exposure, before the shutter disks 35 to 38 in FIG. 20 come to locate the slits 35c to 38c in the positions of the two-dot-chain lines. At the time T3, the tooth 67b comes in mesh with the wheel 61a. The shutter disks 35 to 38 rotate at the low speed. At the time T4, the tooth 67b is disengaged from the wheel 61a. The shutter disks 35 to 38 in FIG. 20 come to locate the slits 35c to 38c in the positions of the solid lines. As illustrated in FIG. 20, the shutter disk 36 has a rotational position such that an advancing edge of the slit 36c defines the angle θ5 from the center of the stationary opening 50c. The shutter unit 12 stands by for a third exposure which is to have a duration of exposure time equal to the second exposure.

Figure 21:
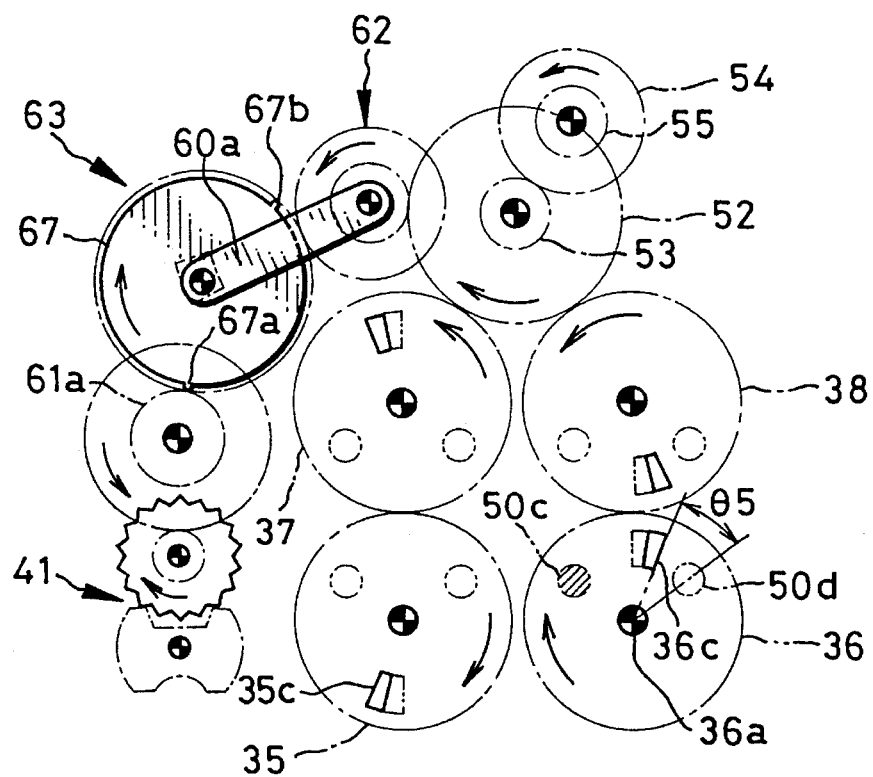

Upon the time T4, the shutter disks 35 to 38 rotate at the high speed. The rotation causes the slit 36c to pass in front of the stationary opening 50c, and to effect the third exposure, before the shutter disks 35 to 38 in FIG. 21 come to locate the slits 35c to 38c in the positions of the two-dot-chain lines. At the time T5, the tooth 67a comes in mesh with the wheel 61a. The shutter disks 35 to 38 rotate at the low speed. At the time T6, the tooth 67a is disengaged from the wheel 61a. The shutter disks 35 to 38 in FIG. 21 come to locate the slits 35c to 38c in the positions of the solid lines. As illustrated in FIG. 21, the shutter disk 36 has a rotational position such that the advancing edge of the slit 36c defines the angle θ5 from the center of the stationary opening 50d. The shutter unit 12 stands by for a fourth exposure which is to have a duration of exposure time equal to the third exposure.

Figure 22:
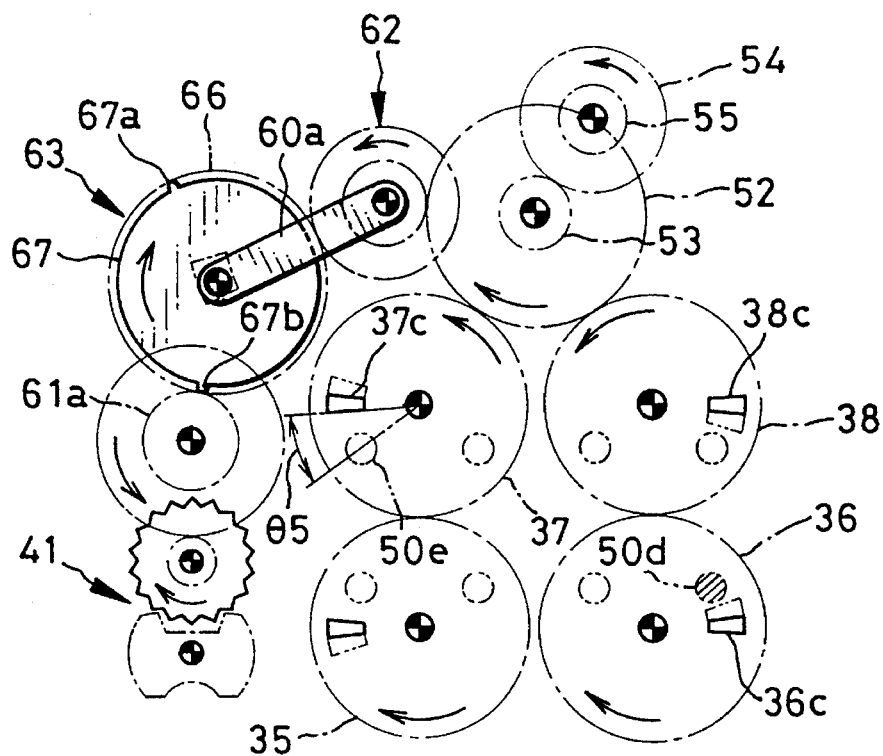

Upon the time T6, the shutter disks 35 to 38 rotate at the high speed. The rotation causes the slit 36c to pass in front of the stationary opening 50d, and to effect the fourth exposure, before the shutter disks 35 to 38 in FIG. 22 come to locate the slits 35c to 38c in the positions of the two-dot-chain lines. At the time T7, the tooth 67b comes in mesh with the wheel 61a. The shutter disks 35 to 38 rotate at the low speed. At the time T8, the tooth 67b is disengaged from the wheel 61a. The shutter disks 35 to 38 in FIG. 22 come to locate the slits 35c to 38c in the positions of the solid lines. As illustrated in FIG. 22, the shutter disk 37 has a rotational position such that an advancing edge of the slit 37c defines the angle θ5 from the center of the stationary opening 50e. The shutter unit 12 stands by for a fifth exposure which is to have a duration of exposure time equal to the fourth exposure.

Figure 23:
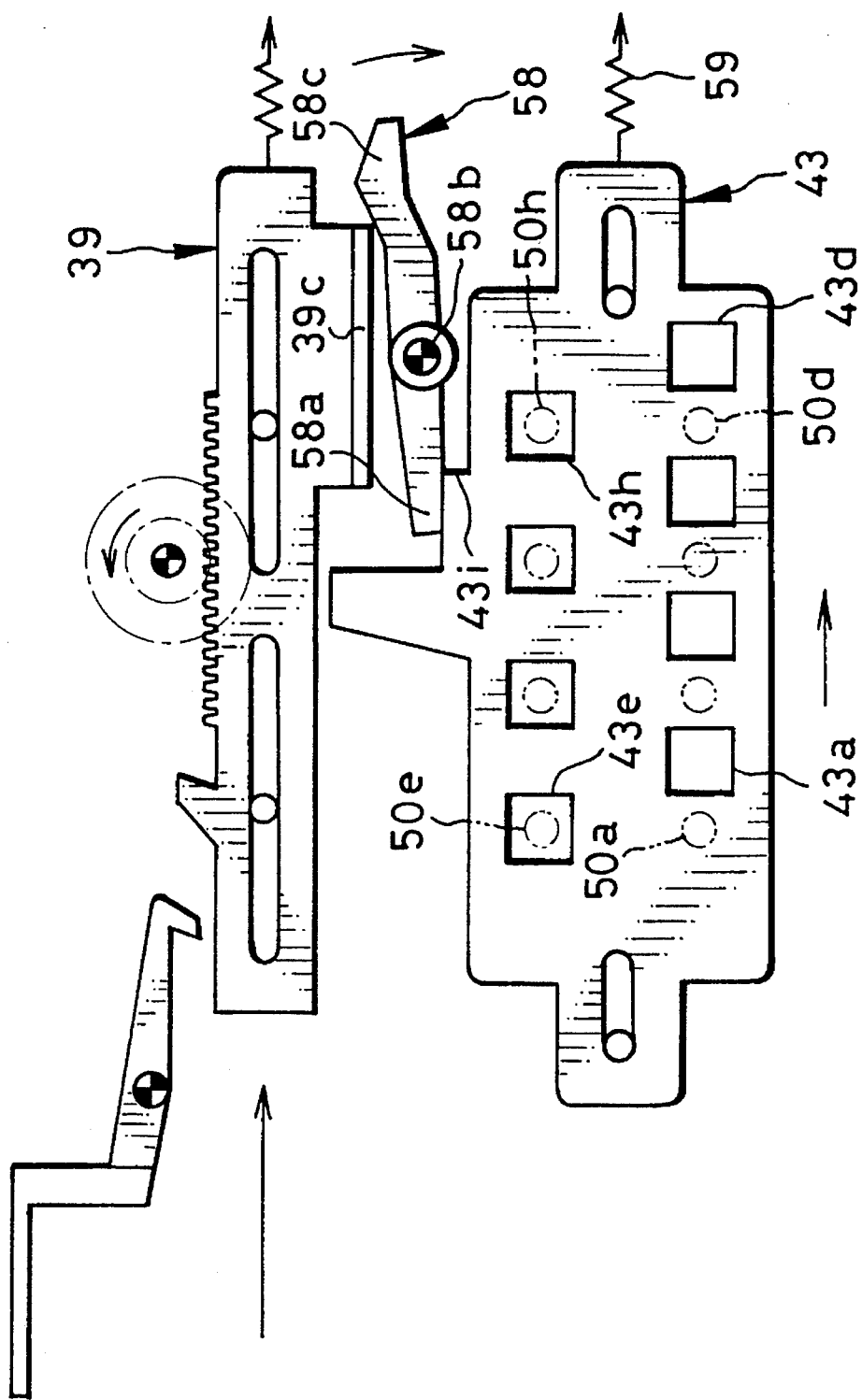
FIG. 23 is an explanatory view illustrating the changeover plate when changed over.

When the shutter disks 35 to 38 finish the one rotation to locate the slits 35c to 38c in the positions of the solid lines in FIG. 22, the slide plate 39 comes to the position in FIG. 23. The bottom ridge 39c of the slide plate 39 comes in contact with the opposite end 58c of the changeover lever 58, which is rotated clockwise about the shaft 58b. The rotation of the changeover lever 58 disengages its end 58a from the stepped recess 43i in the changeover plate 43, which is moved to the right by the bias of the spring 59. Note that the changeover plate 43 is disposed directly behind the stationary openings 50a to 50h movably, so that it is advantageous that movable openings 43a to 43h can have only a small size as required, and that the range of moving the changeover plate 43 can be reduced to a minimum as required.

The movement of the changeover plate 43 retracts the movable openings 43a to 43d from the optical axes of the taking lenses 28a to 28d. The movable openings 43e to 43h lie in the optical axes of the taking lenses 28e to 28h. The changeover plate 43 blocks the stationary openings 50a to 50d, and enables the stationary openings 50e to 50h.

Figure 24:
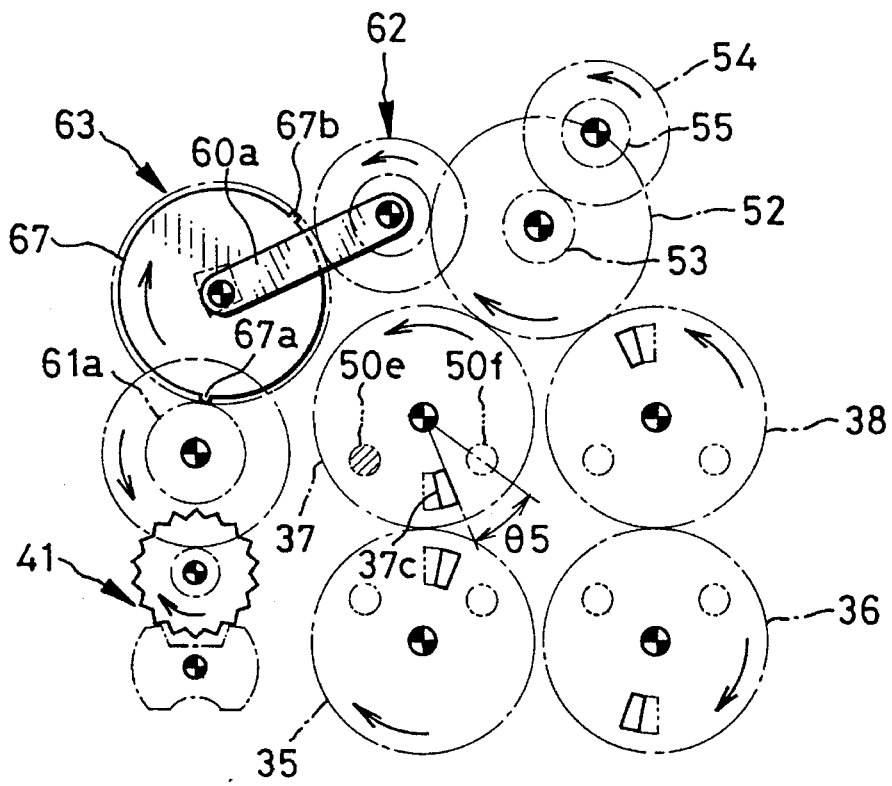
FIGS. 24 to 26 are explanatory views illustrating states of the shutter disks immediately after fifth, sixth and seventh exposures respectively.

Upon the time T8, the shutter disks 35 to 38 rotate at the high speed. The rotation causes the slit 37c to pass in front of the stationary opening 50e, and to effect the fifth exposure, before the shutter disks 35 to 38 in FIG. 24 come to locate the slits 35c to 38c in the positions of the two-dot-chain lines. At the time T9, the tooth 67a comes in mesh with the wheel 61a. The shutter disks 35 to 38 rotate at the low speed. At the time T10, the tooth 67a is disengaged from the wheel 61a. The shutter disks 35 to 38 in FIG. 24 come to locate the slits 35c to 38c in the positions of the solid lines. As illustrated in FIG. 24, the shutter disk 37 has a rotational position such that the advancing edge of the slit 37c defines the angle θ5 from the center of the stationary opening 50f. The shutter unit 12 stands by for a sixth exposure which is to have a duration of exposure time equal to the fifth exposure.

Figure 25:
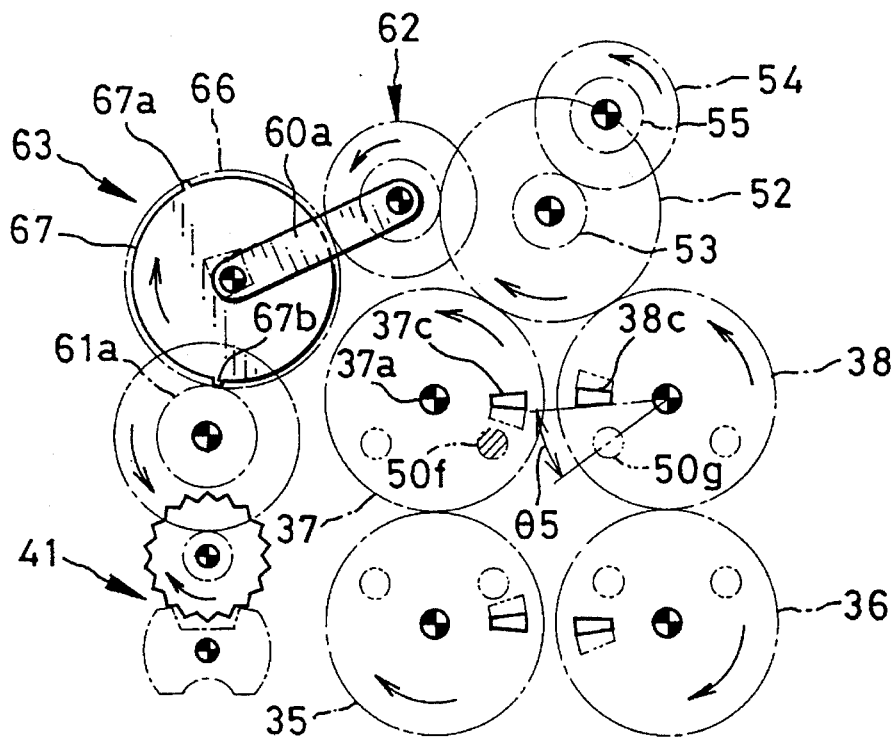

Upon the time T10, the shutter disks 35 to 38 rotate at the high speed. The rotation causes the slit 37c to pass in front of the stationary opening 50f, and to effect the sixth exposure, before the shutter disks 35 to 38 in FIG. 25 come to locate the slits 35c to 38c in the positions of the two-dot-chain lines. At the time T11, the tooth 67b comes in mesh with the wheel 61a. The shutter disks 35 to 38 rotate at the low speed. At the time T12, the tooth 67b is disengaged from the wheel 61a. The shutter disks 35 to 38 in FIG. 25 come to locate the slits 35c to 38c in the positions of the solid lines. As illustrated in FIG. 25, the shutter disk 38 has a rotational position such that an advancing edge of the slit 38c defines the angle θ5 from the center of the stationary opening 50g. The shutter unit 12 stands by for a seventh exposure which is to have a duration of exposure time equal to the sixth exposure.

Figure 26:
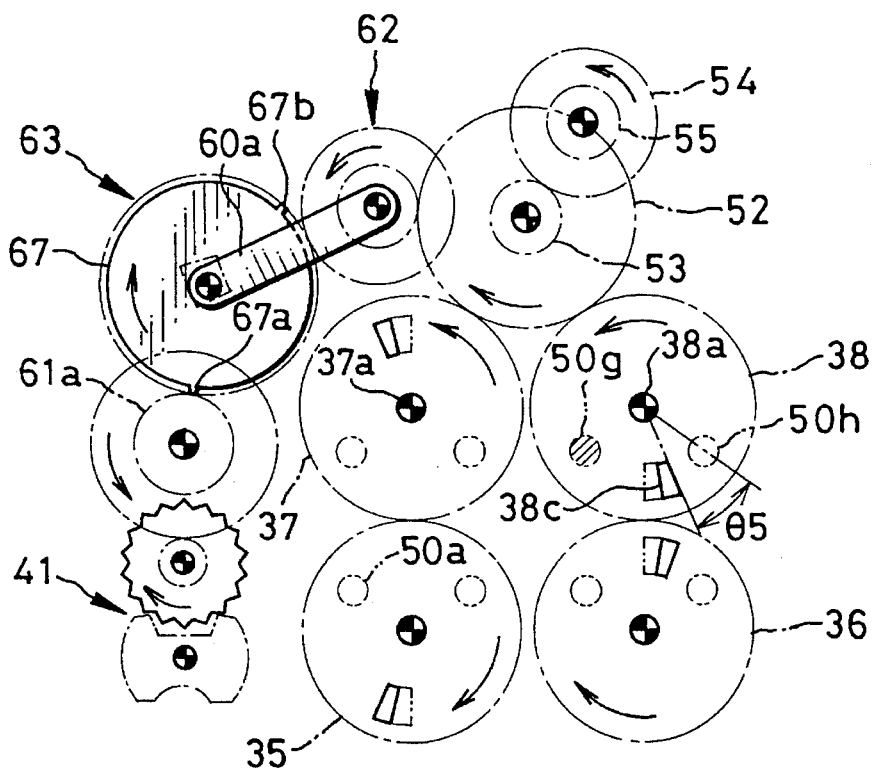

Upon the time T12, the shutter disks 35 to 38 rotate at the high speed. The rotation causes the slit 38c to pass in front of the stationary opening 50g, and to effect the seventh exposure, before the shutter disks 35 to 38 in FIG. 26 come to locate the slits 35c to 38c in the positions of the two-dot-chain lines. At the time T13, the tooth 67a comes in mesh with the wheel 61a. The shutter disks 35 to 38 rotate at the low speed. At the time T14, the tooth 67a is disengaged from the wheel 61a. The shutter disks 35 to 38 in FIG. 26 come to locate the slits 35c to 38c in the positions of the solid lines. As illustrated in FIG. 26, the shutter disk 36 has a rotational position such that the advancing edge of the slit 38c defines the angle θ5 from the center of the stationary opening 50h. The shutter unit 12 stands by for an eighth exposure which is to have a duration of exposure time equal to the seventh exposure.

At the end of the time T14, the shutter disks 35 to 38 rotate at the high speed. The rotation causes the slit 38c to pass in front of the stationary opening 50h, and to effect the eighth or final exposure, before the shutter disks 35 to 38 in FIG. 17 come to locate the slits 35c to 38c slightly before the positions as depicted. At the time T15, the tooth 67b comes in mesh with the wheel 61a. The shutter disks 35 to 38 rotate at the low speed. At the time T16, the tooth 67b is disengaged from the wheel 61a. Then the slide plate 39 terminates its releasing movement.

At the end of the slide of the slide plate 39 in the releasing direction, the roller 82b of the drive lever 82 comes in contact with the slant face 83a of the cam surface 83. The drive lever 82 rotates clockwise about the shaft 86. Responsively the retaining lever 81 is rotated counterclockwise about the shaft 84. The retaining claw 81a is retracted away from the receiving hole 80a in the regulating disk 80, to unlock the sprocket wheel 74 rotationally. The ridge 81b is retracted from the bottom of the winding wheel 23, to unlock the operation of winding the film 21.

The time T16 is set substantially 0.8 second, namely beginning from the actuation of the shutter unit 12 and ending at the stop of the rotation of the shutter disks 35 to 38. The roller 82b of the drive lever 82 stands in contact with the flat face 83b of the cam surface 83, so that the retaining claw of the retaining lever 81 is inserted in the receiving hole 80a. The film 21 is kept from being wound even when a user contacts the winding wheel to apply force to rotate it.

Figure 27:
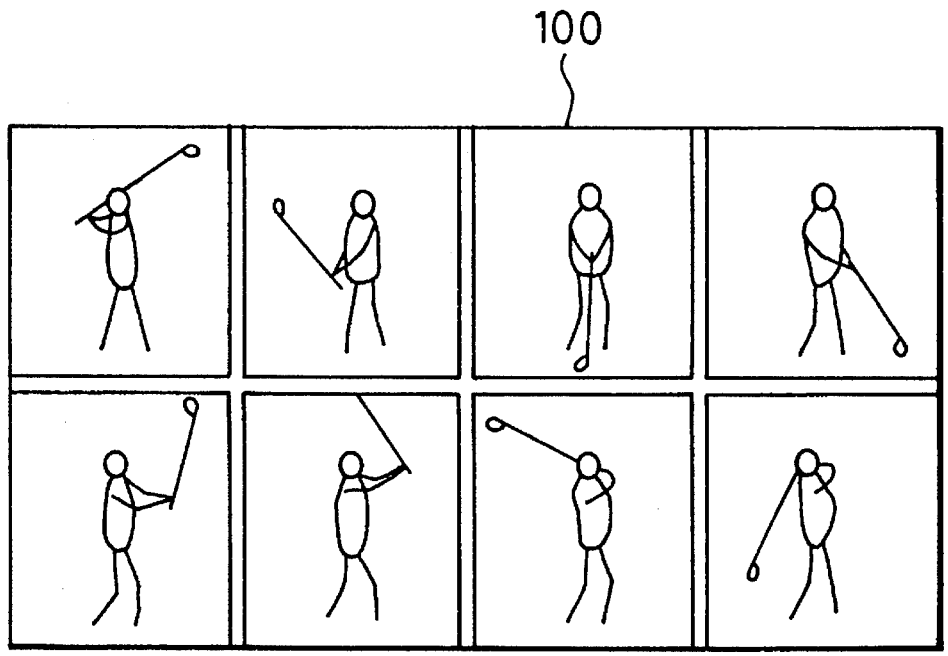
FIG. 27 is a plan view illustrating a wide-vision size photo print produced from photo film as exposed.

Similarly exposures are effected. The film 21 after the exposures is wound into the cassette 22. After the completion of the exposures in the predetermined number, the photo film unit 10 is forwarded to a photo laboratory. To handle the film 21 in the photo laboratory, the cassette 22 is removed by opening the bottom lid 14a on the rear cover 14. The film 21 is developed in a series of conventional steps of the film processing, and printed in a series of conventional steps of the photographic printing. A photo print 100 as illustrated in FIG. 27 is obtained. The photo print 100 has a size of 89×158 mm.

Figure 27A:
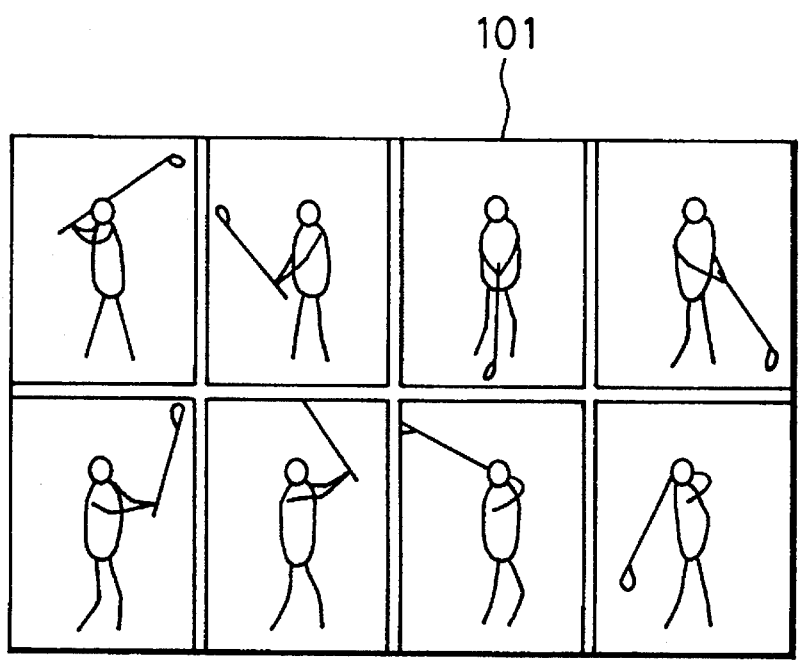
FIG. 27A is a plan view illustrating a photo print produced from a 35 mm full-size frame, exposed in a variant shutter unit.

In the above, the exposure tunnel 16 is formed to create the wide-vision format. In spite of this, a photo film unit of a consecutive photographing type can have an exposure tunnel formed to create a 35 mm full-size format of a single frame, within which eight apertures create eight consecutive imaging sub-frames. With the film developed and printed, a photo print 101 as illustrated in FIG. 27A can be obtained at a size of 89×127 mm.

In the above, the intermittent toothed wheel 67 is linked in the gear train between the wheel 52 and the governor mechanism 41. Alternatively, transmission of rotation between the wheel 52 and the governor mechanism 41 may be performed by a transmitting mechanism exterior to them, e.g. a transmitting lever for moving the governor mechanism 41 up to the wheel 52.

A camera in general has a viewfinder, in which a viewfield frame is formed for indicating a range which can be photographed through the camera. A user of the camera frames a photographic subject with reference to the viewfield frame. There is another known viewfinder in which a target mark appears for indicating a center of the photographable range. If the camera incorporates an auto-focus (AF) device, the target mark is also used as rangefinding mark at which the subject distance is automatically measured. Such mark has a small shape of "+", "o" or "[ ]".

Figure 41:
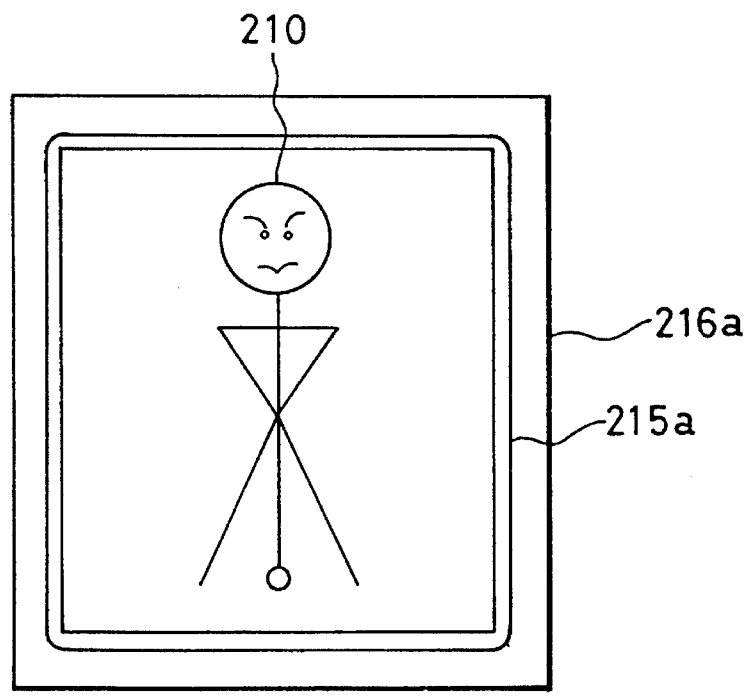
FIG. 41 is an explanatory view illustrating an image seen through a viewfinder of a comparable camera.
Figure 42:
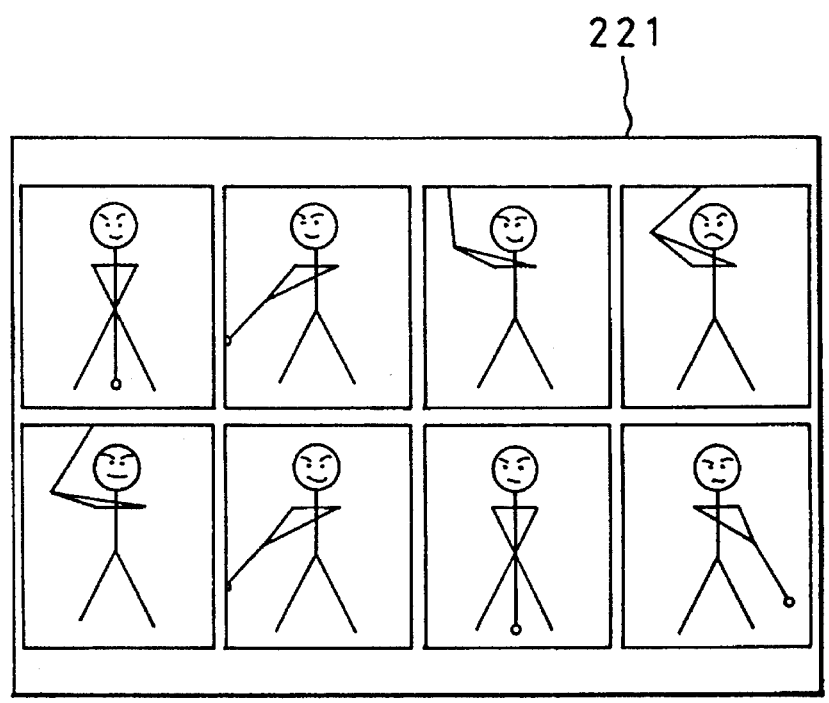
FIG. 42 is a plan view illustrating a photo print resulted from the comparable camera.

There is a drawback in the conventional viewfinder for the consecutive taking camera. As illustrated in FIG. 41, an unskilled user of the camera, to photograph a golf player as principal subject 210, targets it with reference to a viewfield frame 215a formed in a finder viewfield 216a. The principal subject 210 is framed at the center of the viewfield frame 215a while photographing it. When a photo print 221 is obtained from the film as exposed in such a manner as illustrated in FIG. 42, it is found that a head of the player's club is located out of some of the sub-frames. This is failure in photographing the whole of swinging motion of the golf player.

If a target mark is located at the center of the viewfield, a photographer is likely to set the target mark at the center of the principal subject, to result in similar failure. It would be possible for a skilled photographer to target the subject 210 by framing it artificially in a lower portion of the viewfield frame 215a. However the photography in this manner is highly difficult for unskilled users including amateur sportmen and amateur photographers.

Figure 28:
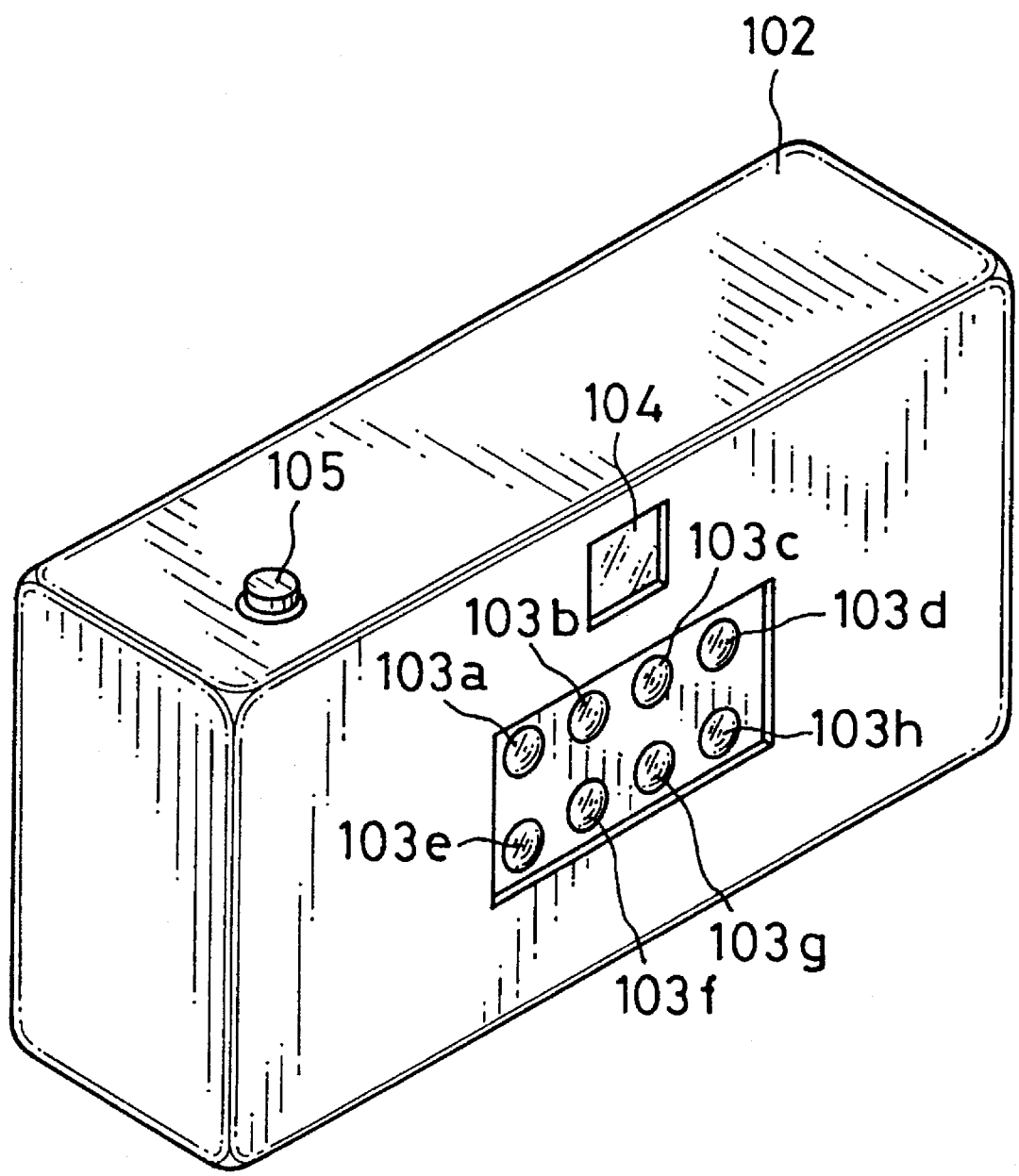
FIG. 28 is a perspective view illustrating another preferred consecutive taking camera, which has an improved viewfinder.
Figure 29:
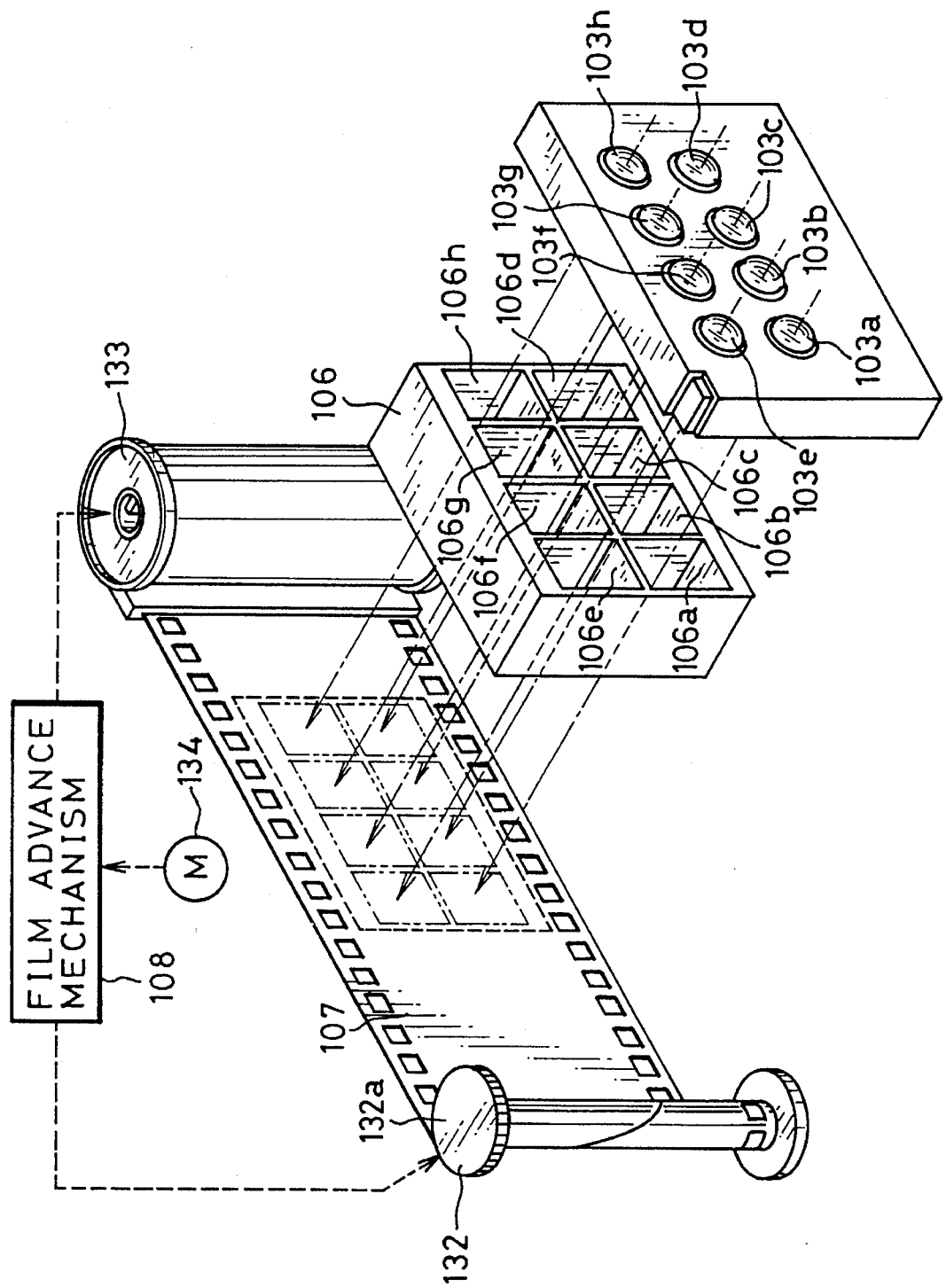
FIG. 29 is an explanatory view illustrating optical paths of the consecutive taking camera in FIG. 28.

FIG. 28 illustrates another preferred consecutive taking camera with a viewfinder 104 constructed with convenience in framing a photographic subject. A camera body 102 has a group of taking lenses, the viewfinder 104, and a shutter release button 105. The taking lens group, as illustrated in FIG. 29, is constituted of eight taking lenses 103a to 103h, which are formed collectively from acrylic resin in fashion integrally with one another.

Behind the taking lens group 3, an exposure tunnel 106 is located, and consists of eight apertures 106a to 106h arranged in two rows and four columns. With a shutter unit actuated for an exposure through the apertures 106a to 106h, eight sub-frames are created on the film 107 within a single frame of 35 mm full-size format.

Between the taking lens group and the exposure tunnel 106, two shutter disks or plates of a rotary structure (not shown) are arranged. Both shutter disks make one rotation to effect an exposure on the photo film 107. The camera body 102 incorporates a film advance mechanism 108 for winding the film 107 after each exposure effected.

The film 107 is wound by rotation of a take-up spool 132 in a counterclockwise direction inside a photo film take-up chamber, while the film 107 is drawn out of a cassette 133 contained in a cassette chamber. A film winding motor 134 is connected to the film advance mechanism 108. To advance the film 107, the rotational force of the motor 134 is applied to the take-up spool 132 to wind the film 107. To rewind the film 107, the rotational force of the motor 134 is applied to a fork engaged with a spool in the cassette 133.

Figure 30:
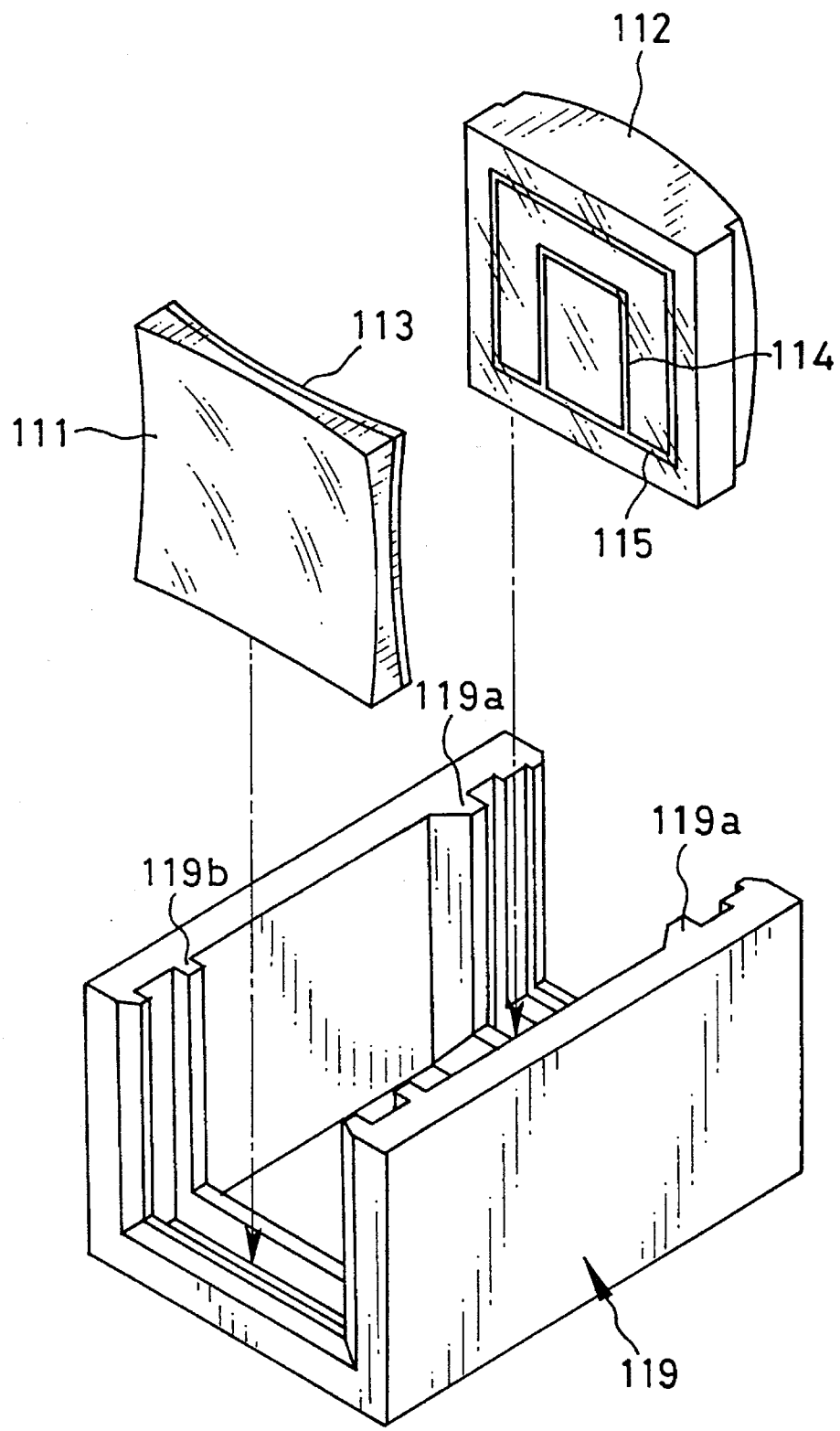
FIG. 30 is an exploded perspective view illustrating the viewfinder of the camera.

FIG. 30 illustrates the Van Albada viewfinder 103 as a reversed Galilean type, which is constituted of an objective lens 111, an eyepiece lens 112, and a finder body 119 supporting the objective lens 111 and the eyepiece lens 112. The objective lens 111 is provided with deposit of a semi-transparent mirror coating 113 covering on a surface confronting the eyepiece lens 112.

The eyepiece lens 112 is provided with deposited material in shapes of indicia of a viewfield frame 115 and a subject frame 114 on a surface confronting the objective lens 111. The eyepiece lens 112 and the objective lens 111 are inserted in the finder body 119 by firmly contacting the support ridges 119a and 119b formed on the finder body 119.

Figure 31:
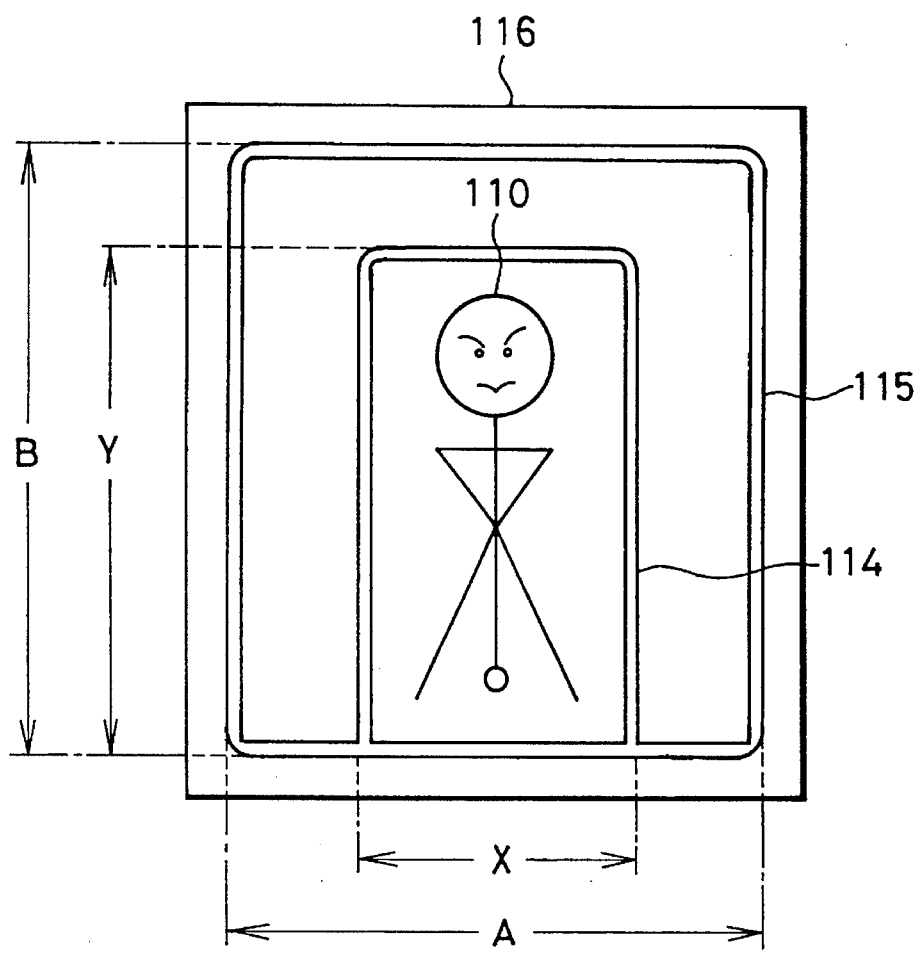
FIG. 31 is an explanatory view illustrating an image seen through the viewfinder.

The sizes of the subject frame 114 and the viewfield frame 115 are determined to meet:

$$0.4 A > X > 0.6 A$$

$$0.65 B > Y > 0.8 B$$

where A is a horizontal width of the viewfield frame 115, B is a vertical length of the viewfield frame 115, X is a horizontal width of the subject frame 114, and Y is a vertical length of the subject frame 114. As illustrated in FIG. 31, the subject frame 114 is formed vertically long, and has a center located lower than a center of the viewfield frame 115. There takes place a space over the top edge of the subject frame 114 within the viewfield frame 115. To photograph a principal subject 110 of a golf player who is about to swing his club, the principal subject 110 is targeted inside the subject frame 114, to include an image of his club in the viewfield frame 115.

The operation of the above embodiment is described now. To photograph a swinging motion of the golf player, the user targets or frames the principal subject 110 at the inside of the subject frame 114 in FIG. 31o The principal subject 110 grips and holds his club in the lower position without raising it.

Figure 32:
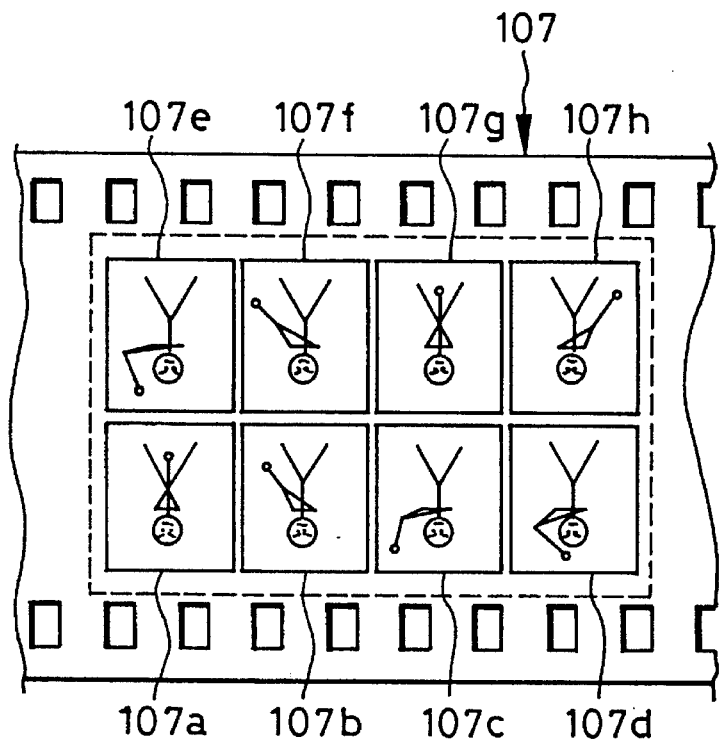
FIG. 32 is an explanatory view illustrating eight sub-frames created on photo film by the camera.
Figure 33:
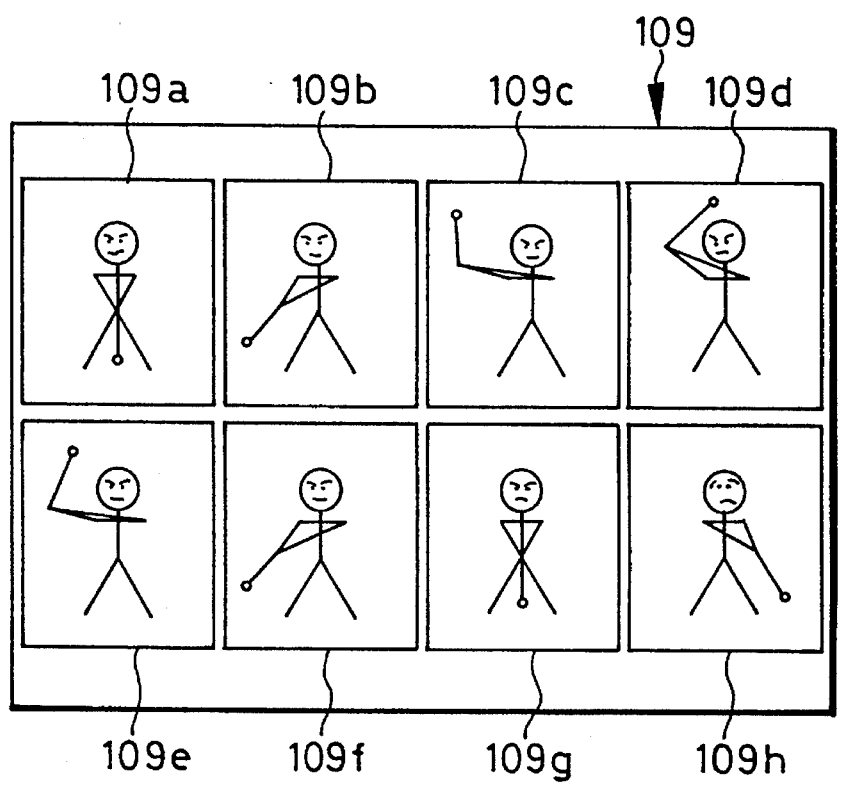
FIG. 33 is a plan view illustrating a photo print resulted from the camera.

The principal subject 110 at first raises his club, stops his club directly above his head for a short time, and then swings it down. At the same time as the beginning of the swing, a user of the camera depresses the shutter release button 105. The two shutter disks make one rotation. The film 21 is exposed to light from the principal subject 110 through the taking lenses 103a to 103h and the apertures 106a to 106h. As illustrated in FIG. 32, the consecutive eight sub-frames 107a to 107h are created from the left to the right inside a frame indicated by the dotted line in the film 107.

When the film 107 is developed and subjected to photo printing, eight consecutive printed sub-frames 109a to 109h are obtained as a consecutive taken photo print. There are occasions where a head of the club comes outside the subject frame 114 as seen in the printed sub-frames 109c or 109d. However, the principal subject 110 is framed with the subject frame 114, so that the club head can be included in the viewfield frame 115 to photograph the whole of the motion of the principal subject 110.

There are many amateur golf players who practice swinging their club in a square, park or other place near their home, and have an occasion of having a passer-by to take a photograph of his swinging form, so as to analyze their form visually with the photograph in comparison with that of exemplary golf players famous for excellence. If the passer-by is unfamiliar with consecutive photography of a moving golf player, he can frame the principal subject 110 at the inside of the subject frame 114 in sufficiently well-centered fashion without any other attention than depressing the shutter release button 105. The present invention is advantageous also in use where a golf player wishes to compare his present swinging form to his former swinging form having been recorded by the same consecutive photography. Instead of photographing the golf player, it is possible to photograph a karate wrestler or an athlete of aerobics, who is a person in motion in a range surrounding his or her body as principal subject 110.

In the above, the eyepiece lens 112 in use is provided with the deposit of the viewfield frame 115 and the subject frame 114. Alternatively the viewfield frame 115 can be eliminated from an eyepiece lens with the subject frame 114. Edges defined inside a viewfinder can constitute a frame around the viewfield. Preferred proportions between the sizes of the subject frame 114 and the inside edges of the viewfinder are the same as the above embodiment where relations between A, B, X and Y are limited.

In the above, the bottom of the subject frame 114 is positioned on the bottom of the viewfield frame 115 or the viewfield itself. Alternatively a bottom of a subject frame 114 may be higher than the bottom of the viewfield frame 115 or the viewfield itself at a small amount. In the above, the indicia of the subject frame 114 and the viewfield frame 115 consist of solid lines of deposited material. Alternatively, indicia of a subject frame and a viewfield frame may consist of broken lines, or sets of marks located at corners of both frames.

Figure 34:
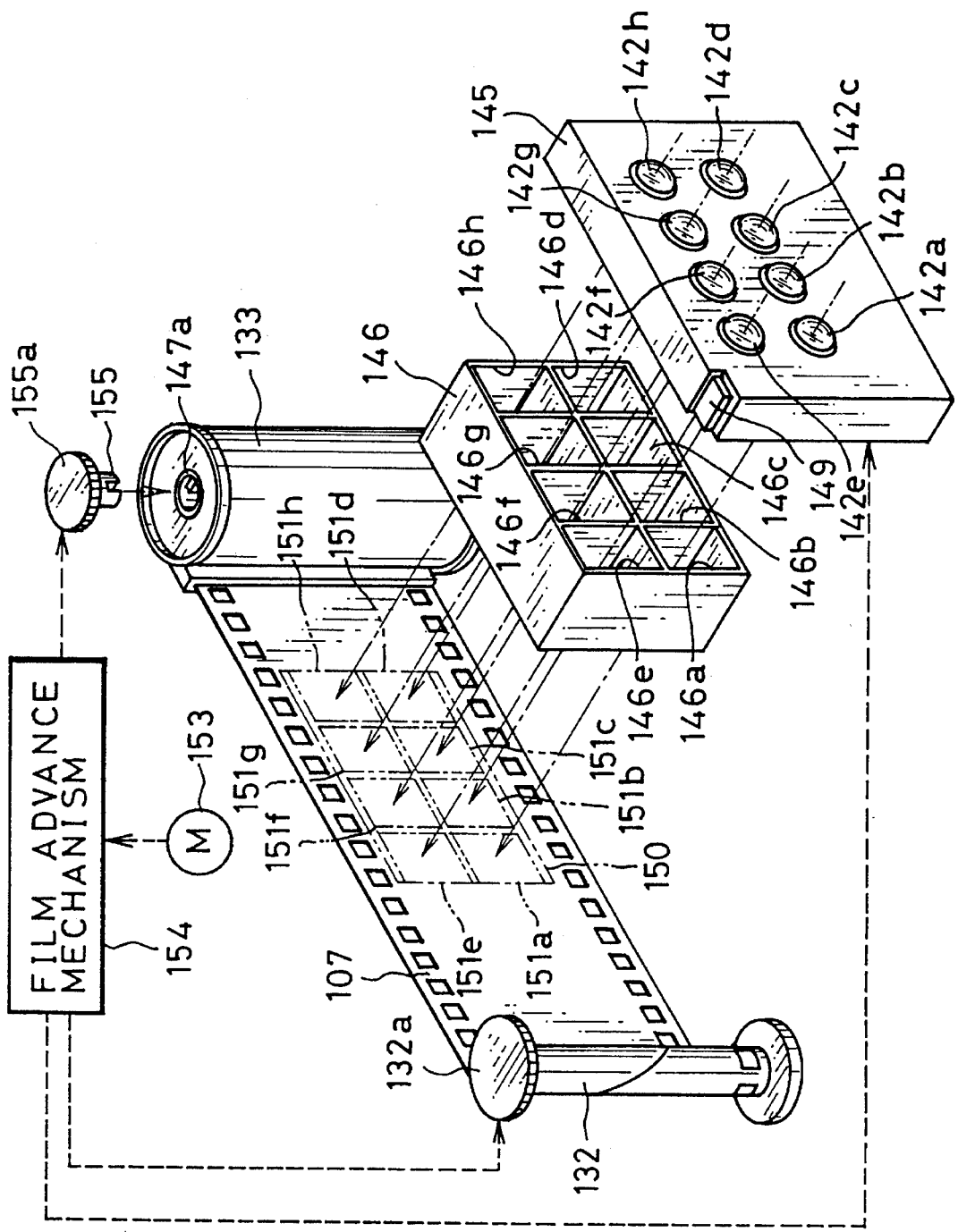
FIG. 34 is an explanatory view illustrating optical paths of another preferred consecutive taking camera, in which a shutter unit is driven by a motor.

FIG. 34 illustrates a variant which is similar to the camera in FIGS. 28 and 29 but incorporates a motor-driven shutter unit and has a wide-vision format. Elements similar to the above embodiment are designated with identical reference numerals.

A shutter unit 145 has a depressible member 149 to be accessed by a bottom of the shutter release button 105. When the shutter release button 105 is actuated, responsively the depressible member 149 is depressed to operate the shutter unit 145, which, in time-sequential fashion, opens/closes stationary openings associated with taking lenses 142a to 142h.

An exposure tunnel 146 has eight exposure apertures 146a to 146h. A horizontal range from the aperture 146a to the aperture 146d, or from the aperture 146e to the aperture 146h, is as long as a length of a single frame of the wide-vision size (20.8×36 mm), which has an aspect ratio of 16/9. Each vertical range of the apertures 146a to 146h is approximately half as long as the vertical range of the wide-vision frame. When the exposure is effected through the apertures 146a to 146h, consecutive taken eight sub-frames 151a to 151h are created in two rows on the film 107, as illustrated in FIG. 34, in a range vertically smaller than a 35 mm full-size frame 150 (24×36 mm).

When the film 107 is advanced to stand by for exposure, the shutter unit 145 is charged. The force of a motor 153 is applied via a film advance mechanism 154 to the shutter unit 145 to charge it.

In operation, at first the shutter unit 145 opens/closes at the taking lens 142a, to create the first sub-frame 151a on the film 107. Similarly the shutter unit 145 opens/closes at the taking lenses 142b to 142h, to create the second to eighth sub-frames 151b to 151h on the film 107. The eight consecutive exposures are a sequence within a duration as short as approximately one second.

Figure 35:
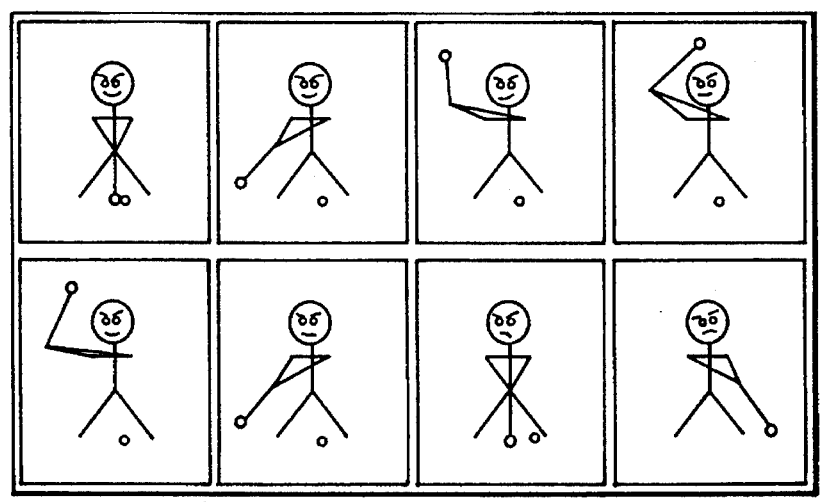
FIG. 35 is a plan view illustrating a photo print resulted from the camera of FIG. 34.

A photo print as illustrated in FIG. 35 is obtained from the film 107 with the sub-frames 151a to 151h. Note that there is a small space between the exposure tunnel 146 and the film 107. Although there are walls formed between the apertures 146a to 146h, the space enables the light from the subject to coincide behind each wall so as to avoid leaving the film 107 unexposed behind the walls. This is advantageous in that no black lines appear on the photo print between printed sub-frames, which can have edges of somewhat whitish color caused by a greater amount of incident light to the film 107.

In the above, eight sub-frames are created. Alternatively six sub-frames can be created in two rows and three columns. This is advantageous in that the size of each printed sub-frame on a photo print can be agreeably greater, in accordance with the smaller number of the sub-frames.

Figure 36:
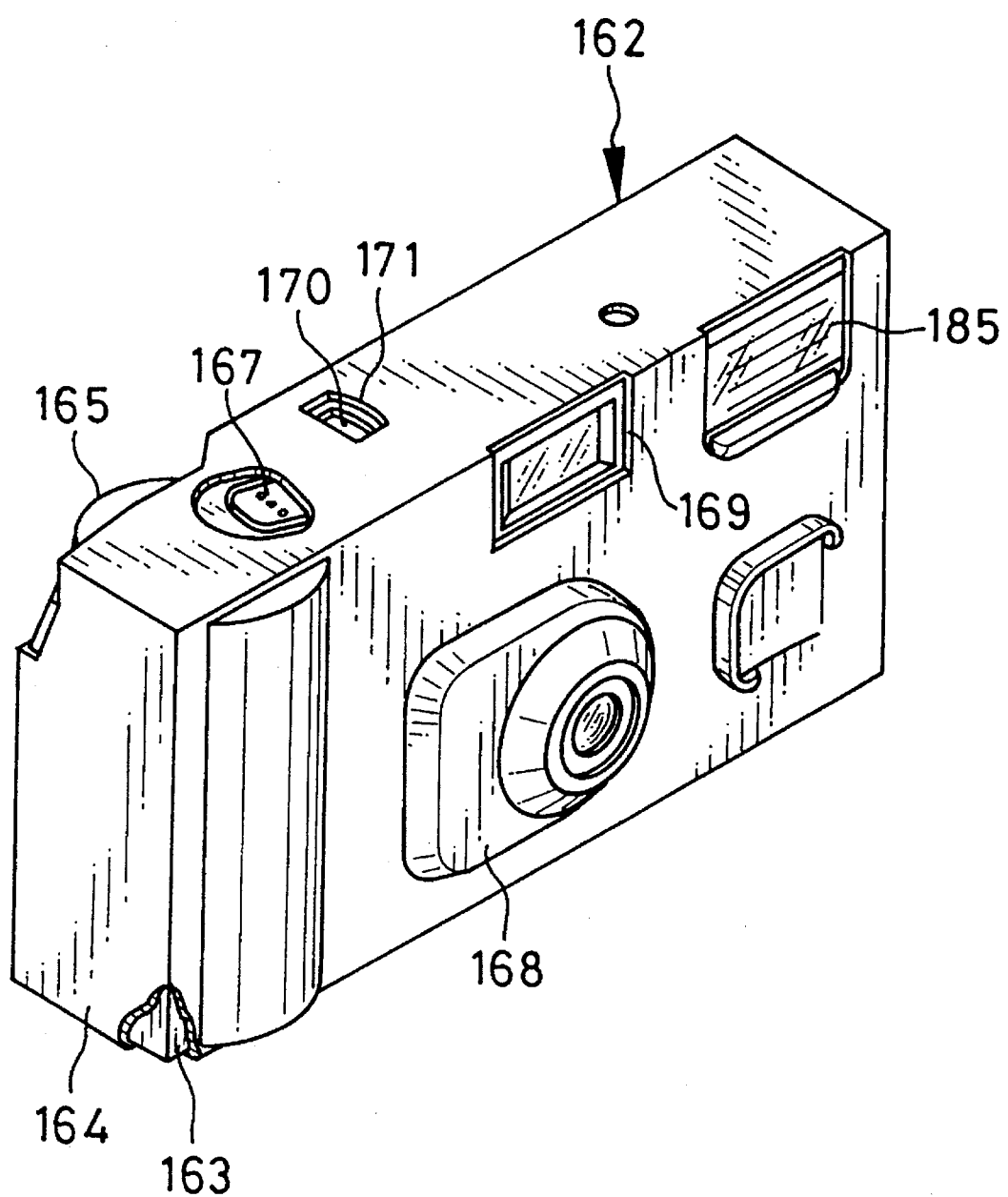
FIG. 36 is a perspective view illustrating a lens-fitted photo film unit of another preferred embodiment, in which engagement of a one-toothed gear is improved.

FIG. 36 illustrates an embodiment of which a film counter wheel is in better engagement with a shutter unit. The present embodiment is applicable to a consecutive taking camera, but is herein described with a conventional photo film unit of a single exposure without consecutive photography, because the present embodiment is applicable to any photographic camera.

A lens-fitted photo film unit 162 is constructed to have a body of a somewhat reduced thickness, and consists of a film housing 163 structured for effecting exposure, and an external cardboard wrapper 164 packaging the film housing 163. The external cardboard wrapper 164 has openings through which a winding wheel 165, a flashing section 185 and a shutter release button 167 appear out of the film housing 163. The wrapper 164 also has openings for a lens hood 168, a finder window 169 and a counter wheel 170 observable through a counter window 171.

Figure 37:
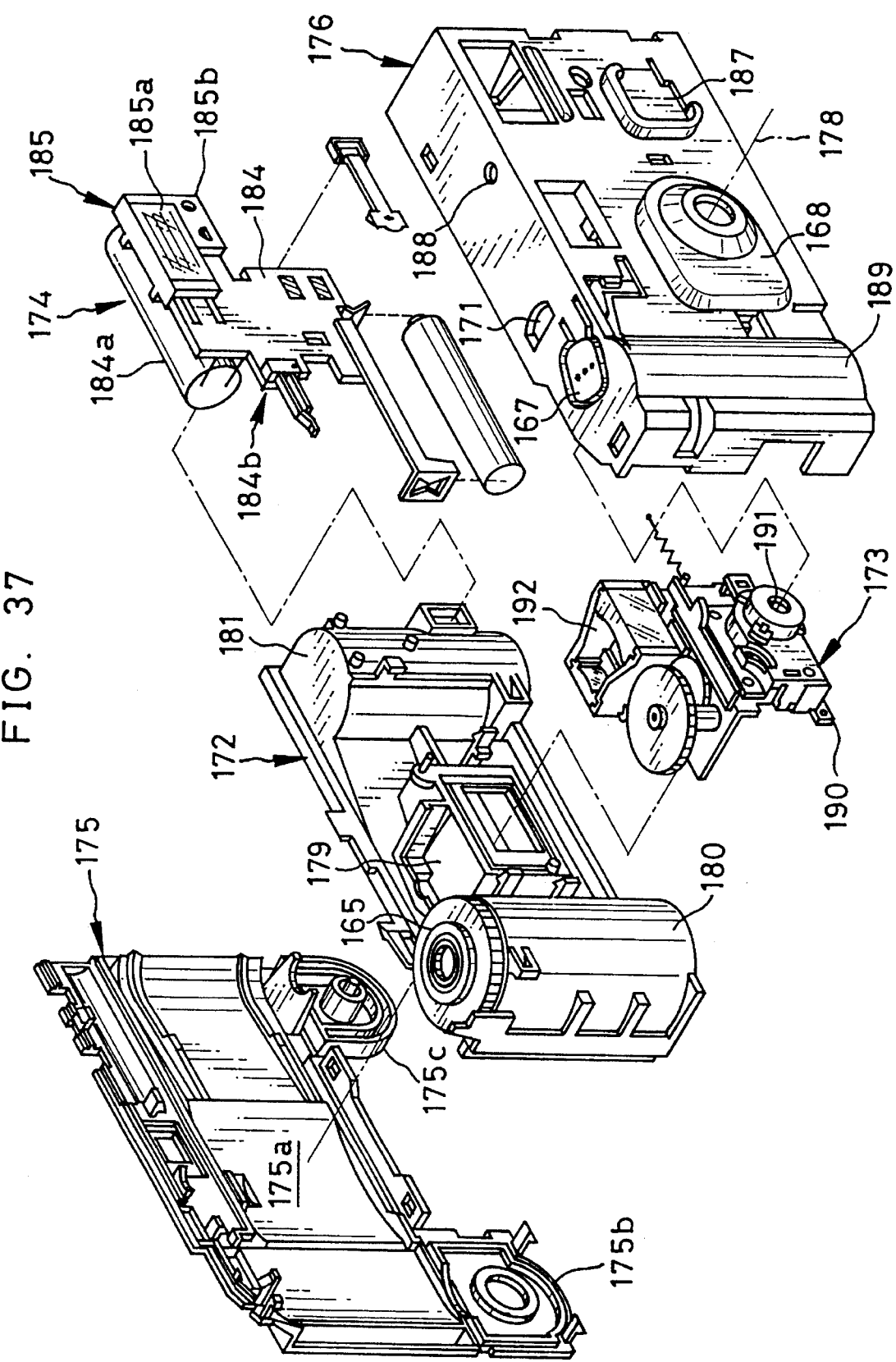
FIG. 37 is an exploded perspective view illustrating the photo film unit.

As illustrated in FIG. 37, the film housing 163 consists of a main body 172, a shutter unit 173, an electronic flash device 174, a rear cover 175 and a front cover 176. Those elements are secured together in engagement of hooks in detachable fashion.

The main body 172 is generally formed of opaque plastics, and has an exposure tunnel 179 along an optical path 178. The rear of the exposure tunnel 179 defines an aperture where photo film 193 is to be exposed. The exposure tunnel 179 is located between a cassette chamber 180 and a roll chamber 181, both formed in the main body 172. The front wall of the cassette chamber 180 is projected toward the front over the level of the front wall of the roll chamber 181.

The flash device 174 is constituted of a printed circuit board 184 and the flashing section 185. The circuit board 184 is provided with electric circuits 184a as electronic flash circuits and a flashing switch 184b turned on by a shutter mechanism of the shutter unit 173. The flashing section 185 is constituted of a flash tube, a concave reflector, a diffusing plate 185a, and a resinous holder 185b in which those elements are fitted.

The rear cover 175 is formed of opaque plastics, and has a film support face 175a confronting the exposure tunnel 179. The bottom of the rear cover 175 has lids 175b and 175c which are of a pull-top type, and cover the bottom of the cassette chamber 180 and the roll chamber 181. The lid 175b is adapted to removal of the cassette having contained the photo film 193 after exposure.

The front cover 176 is formed of transparent plastics, and provided with the shutter release button 167, the lens hood 168, the finder window 169, the counter window 171, a flash charging switch 187, and a pilot lamp window 188. A curved portion 189 is formed in the front cover 176 to receive the front of the cassette chamber 180, and is adapted as a grip convenient for the user in photography.

The shutter unit 173 has a base portion 190 of opaque plastics, which incorporates a one-frame advance mechanism, the film counter mechanism, and the shutter mechanism. A taking lens 191 is fitted in front of the base portion 190, on the top of which a viewfinder 192 is mounted. The shutter unit 173 is secured in front of the main body 172 in detachable fashion.

Figure 38:
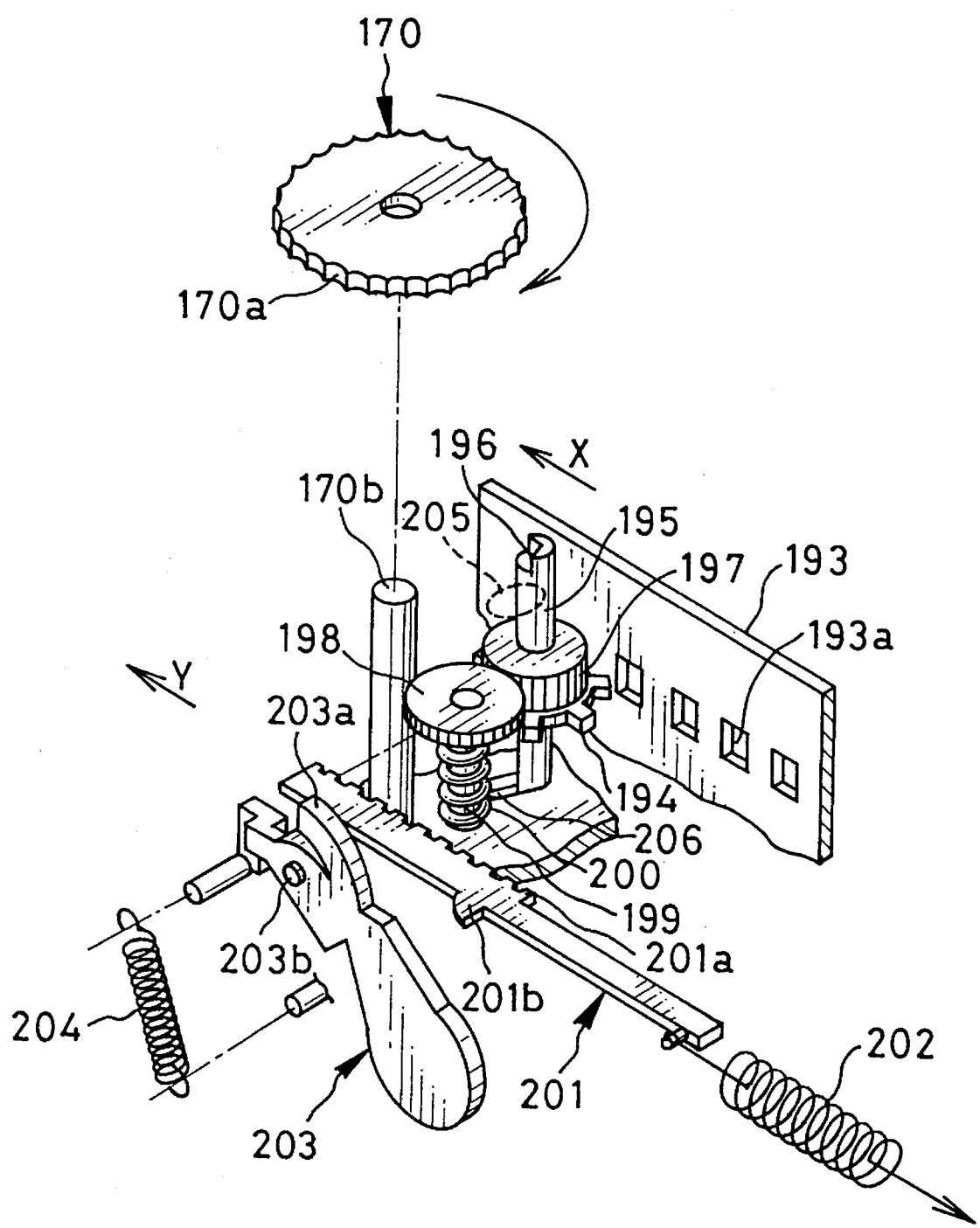
FIG. 38 is a perspective view illustrating a film counter mechanism.

FIG. 38 illustrates the film counter mechanism. When the film 193 is wound and moved in the arrow direction X as shown, a driven sprocket wheel 194 engaged with perforations 193a is rotated counterclockwise about a rotary shaft 195. The sprocket wheel 194 is shaped to make one rotation in the course of movement of the film 193 as far as one frame. The shaft 195 is provided with a one-toothed gear 196, a charging gear 197, and the sprocket wheel 194. The one-toothed gear 196 consists of a single V-notch formed in the rotary shaft 195, and is engaged with teeth 170a around the counter wheel 170. With one rotation made at the one-toothed gear 196, responsively the counter wheel 170 is rotated about a shaft 170b at an amount of stepping the number to be indicated.

An intermediate gear 198 is in mesh with the charging gear 197, and is supported in both slidable and rotatable fashion on a pin 199 formed on the base portion 190. A coil spring 200 is disposed around the pin 199 for being resistant to the downward slide of the intermediate gear 198. The intermediate gear 198 is accessed by a bottom of the shutter release button 167, and slid down in response to operation of the shutter release button 167.

The intermediate gear 198 is in mesh with a rack 201a formed on the slide plate 201 for releasing the shutter mechanism. A slide plate 201 is moved by the intermediate gear 198 in the arrow direction Y against the bias of a releasing spring 202. The depression of the shutter button 167 slides down the intermediate gear 198, to disengage the intermediate gear 198 from the rack 201a. The slide plate 201 is returned by the releasing spring 202 to the released position as shown. During the returning movement, a striker projection 201b formed on the slide plate 201 is struck on a contact projection 203a of a shutter blade 203, which is rotated clockwise about a shaft 203b against the bias of a spring 204 to expose the film 193. Then the shutter blade 203 is abruptly rotated counterclockwise by the spring 204 to recover its closed state.

Figure 39:
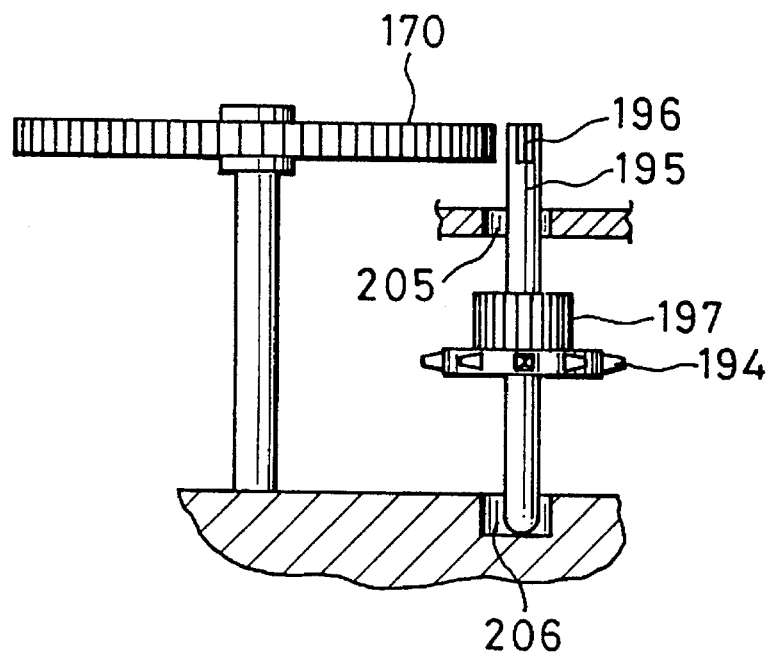
FIG. 39 is an explanatory view in front elevation, illustrating the film counter mechanism.
Figure 40:
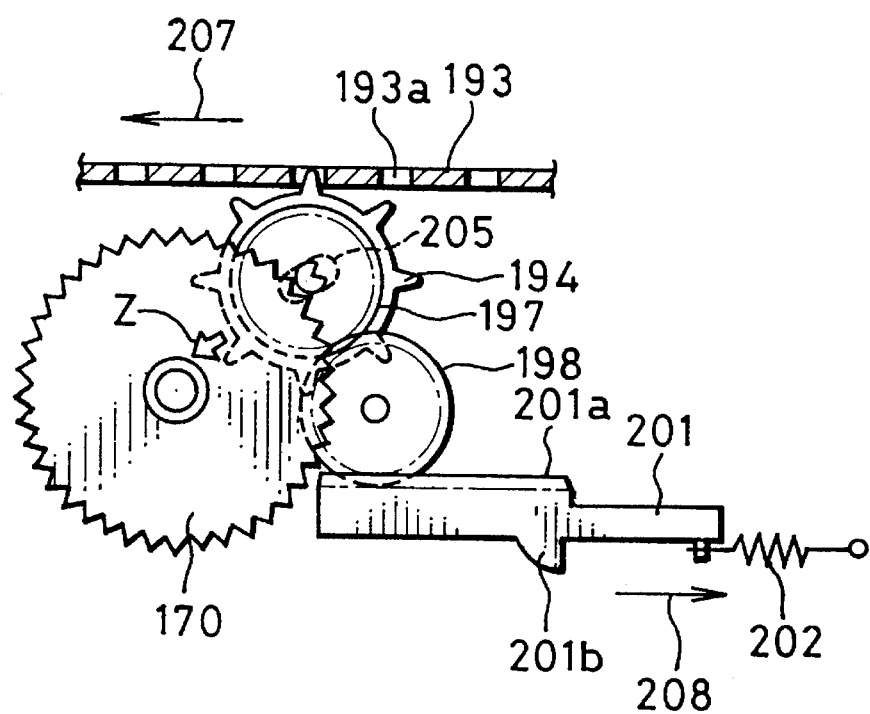
FIG. 40 is a plan view illustrating the film counter mechanism.

As illustrated in FIG. 39, the rotary shaft 195 common to the sprocket wheel 194, the one-toothed gear 196 and the charging gear 197 is inserted in slots 205 and 206 and supported in two positions in fashion movable toward the counter wheel 170. The rotary shaft 195, as illustrated in FIG. 40, receives application of force 207 caused by the film 193 moving for being wound in mesh with the sprocket wheel 194, and of force 208 caused by the releasing spring 202 driving the slide plate 201 and the intermediate gear 198 in mesh with the charging gear 197. Thus the rotary shaft 195 is slid in the arrow direction Z to press the one-tooth gear 196 against the counter wheel 170.

The operation of the embodiment is described now. Through the counter window 171 in the top of the photo film unit 162, the counter wheel 170 is observable to check the number of the remaining frames photographable on the film 93. It is possible to check the degree of the use of the photo film unit 162. If a dot "." is observed, it indicates that the photo film unit 162 is unused. If a letter "E" is observed, it indicates that exposures in all the frames have been taken already.

With the photo film unit 162 before use, the user rotates the winding wheel 165 for charging the shutter mechanism to stand by for effecting exposure. As illustrated in FIG. 40, the rotation of the winding wheel 165 winds the film 193 into the cassette located in the left as viewed in the drawing. The sprocket wheel 194 in mesh with the perforations 193a in the film 193 is rotated in the counterclockwise direction, and pulled by the force 207 of the film 193. The rotary shaft 195 is driven along the slots 205 and 206 toward the counter wheel 170. At the same time the charging gear 197 rotates the intermediate gear 198 clockwise, to slide the slide plate 201 to the left as viewed, against the bias of the releasing spring 202. The biasing force 208 of the releasing spring 202 is transmitted via the intermediate gear 198 while being inverted in the reverse direction, and applied to the charging gear 197. The rotary shaft 195 is driven along the slots 205 and 206 toward the counter wheel 170. Therefore, the one-toothed gear 196 on the rotary shaft 195 is pressed against the counter wheel 170 and brought into mesh therewith in high reliability. Note that the photo film unit has the one-frame advance mechanism (not shown), which stops the winding wheel 165 and the sprocket wheel 194 from rotating, to be resistant to inadvertent force applied by the user to move the film during exposure.

When the slide plate 201 is moved by the intermediate gear 198, the striker projection 201b is passed across the contact projection 203a of the shutter blade 203, until the shutter blade 203 is charged. Then the counter window 171 indicates "27" representing the number of remaining frames photographable on the film 193.

When the shutter release button 167 in the charged state is depressed, a rod (not shown) formed under the shutter release button 167 depresses the intermediate gear 198 against the bias of the spring 200. The depression of the intermediate gear 198 disengages the intermediate gear 198 from the rack 201a, to allow the slide plate 201 to return to its released position by the bias of the releasing spring 202. The striker projection 201b strikes the contact projection 203a rapidly, and swings the shutter blade 203 to open/close the tunnel 179. Note that the sprocket 194 is located under the level of the slide plate 201, so that the intermediate gear 198 is prevented from being pushed on the sprocket wheel 194.

After the release of the shutter unit 173, the user moves his finger away from the shutter button 167. The intermediate gear 198 is caused by the spring 200 to slide up, and is engaged again with the rack 201a, to stand by for another operation of charging the shutter unit 173. When the winding wheel 165 is rotated, the shutter unit 173 is charged. The film 193 is moved as far as one frame. The movement of the film 193 and the bias of the releasing spring 202 cooperate to press the one-toothed gear 196 against the counter wheel 170 in the manner the same as the former. The counter wheel 170 can be rotated at the amount of stepping the number in firm engagement without failure.

This embodiment has been described as applied to the lens-fitted photo film unit of simple exposure and of a single-use type. However the embodiment is applicable to any camera of a reusable type, and to a camera for taking consecutive exposures upon a single release of the shutter.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A consecutive taking camera for taking plural exposures time-sequentially in a single frame on photo film, a shutter disk provided with a shutter slit and rotated from an initial position upon a single releasing operation, said shutter slit moved past plural stationary openings, said consecutive taking camera comprising:

a drive device, moving in a releasing direction in response to said releasing operation, for rotating said shutter disk;

a speed reducing device for reducing speed of rotation of said shutter disk if coupled with said drive device; and a transmitting device, associated with said drive device and/or said speed reducing device, for displacing said drive device and said speed reducing device between coupled and uncoupled states, said coupled state coupling said drive device with said speed reducing device, and said uncoupled state uncoupling said drive device from said speed reducing device; wherein said transmitting device sets said coupled state when said shutter slit is away from said stationary openings; said transmitting device exits from said coupled state to set said uncoupled state in response to coming of said shutter slit to a predetermined angular position, where said angular position is respectively a predetermined angle short of said stationary openings; and said transmitting device keeps said uncoupled state while said shutter slit is moved past said stationary openings.

2. A consecutive taking camera as defined in claim 1, wherein said transmitting device includes an intermittent toothed wheel, rotated by said drive device, and provided with at least one tooth to be engaged with said speed reducing device, said tooth in said coupled state rotated while receiving resistance from said speed reducing device, said tooth in said uncoupled state located away from said speed reducing device;

further comprising a planetary gear mechanism for revolving said intermittent toothed wheel between engageable and unengageable positions where said intermittent toothed wheel is respectively engageable and unengageable with said speed reducing device, said intermittent toothed wheel located in said engageable position while said drive device moves in said releasing direction, and said intermittent toothed wheel located in said unengageable position while said drive device moves in a charging direction opposite to said releasing direction, or while said intermittent toothed wheel and said speed reducing device are accidentally blocked on one another.

3. A consecutive taking camera as defined in claim 2, wherein at least two adjacent ones of said stationary openings are equally distant from a rotary shaft of at least one said shutter disk; and said adjacent two stationary openings are opened by said one shutter slit in time-sequential fashion.

4. A consecutive taking camera as defined in claim 3, wherein said tooth of said intermittent toothed wheel comprises i teeth, of which an interval from a (k−1)th tooth to a kth tooth is unequal to an interval from said kth tooth to a (k+1)th tooth, where i is at least two, and k is an integer from 1 to i; and said stationary openings are arranged to meet:

$\theta_1 \neq \theta_2$ where $\theta_1$ is an angle of rotation of said shutter disk after passage of said shutter slit at a Kth of said stationary openings and before passage of said shutter slit at a (K+1)th of said stationary openings, and $\theta_2$ is an angle of rotation of said shutter disk after said passage of said shutter slit at said (K+1)th of said stationary openings and before passage of said shutter slit at a (K+2)th of said stationary openings.

5. A consecutive taking camera as defined in claim 3, wherein said speed reducing device includes:

an escapement mechanism connected to and rotated by said intermittent toothed wheel; and an anchor mechanism, contacted on two separate ones of teeth formed around said escapement mechanism, and swung by said escapement mechanism actuated via said intermittent toothed wheel, for stepping rotation of said escapement mechanism, to stabilize movement of said drive device.

6. A consecutive taking camera as defined in claim 3, wherein said planetary gear mechanism includes:

a sun gear driven by said drive device;

a planet gear, formed co-axially with said intermittent toothed wheel, in mesh with said sun gear, and driven by said sun gear; and a planet gear arm, connected between rotary shafts of said planet gear and said sun gear, for revolving said planet gear and said intermittent toothed wheel about said sun gear when said sun gear is rotated, to move said intermittent toothed wheel between said engageable and unengageable positions.

7. A consecutive taking camera as defined in claim 6, further comprising:

a gear box disposed around at least said planetary gear mechanism; and a slot, formed in said gear box, for receiving said rotary shaft of said planet gear and said intermittent toothed wheel, to prevent said intermittent toothed wheel from moving beyond a limit away from said speed reducing device when said sun gear is rotated in said charging direction.

8. A consecutive taking camera as defined in claim 1, further comprising a changeover plate device, movable between first and second positions, located in said first position during a first operating step of said shutter disk, for enabling a first one of two groups comprising said stationary openings, and located in said second position during a second operating step of said shutter disk, for enabling a second one of said two groups.

9. A consecutive taking camera as defined in claim 8, further comprising:

a first group of movable openings, formed in said changeover plate device, and superposed on said first group of said stationary openings when located in said first position; and a second group of movable openings, formed in said changeover plate device, and superposed on said second group of said stationary openings when located in said second position.

10. A consecutive taking camera as defined in claim 9, wherein said stationary openings are disposed between said changeover plate device and said shutter disk.

11. A consecutive taking camera as defined in claim 9, wherein said shutter disk makes two rotations in association with movement of said drive device; said first and second operating steps are first and second rotations of said shutter disk; said stationary openings are arranged in lower and upper rows; and said first and second groups of said stationary openings are said lower and upper rows of said stationary openings.

12. A consecutive taking camera as defined in claim 11, wherein said stationary openings are equally distant from a rotary shaft of said shutter disk; and adjacent two of said stationary openings in said upper row are opened by said one of plural shutter slits in time-sequential fashion, and adjacent two of said stationary openings in said lower row are opened by another of said plural shutter slits in time-sequential fashion.

13. A consecutive taking camera as defined in claim 1, further comprising a preventing device for preventing said film from being advanced as far as said one frame until an end of said plural exposures after said releasing operation.

14. A consecutive taking camera as defined in claim 1, further comprising:

a winding wheel, externally operated to wind said film as far as said one frame;

a driven sprocket wheel, engaged with perforations in said film, and caused to make one rotation by said film wound and moved;

a retaining device, adapted to accessing said winding wheel, movable from an unretaining position to a retaining position, located in said retaining position for contacting said winding wheel to disable said winding wheel from being rotated, and located in said unretaining position for moving away from said winding wheel to enable said winding wheel to be rotated;

a regulating disk, formed co-axially with said sprocket wheel, for rotating with said sprocket wheel, said regulating disk contacting an end of said retaining device to keep said retaining device in said unretaining position; and a receiving hole, formed in said regulating disk, for receiving said end of said retaining device if said sprocket has a predetermined rotational position, to allow said retaining device to move to said retaining position.

15. A consecutive taking camera as defined in claim 14, wherein said drive device includes a slide plate, slid in said releasing direction toward a released position and in said charging direction toward a charged position, said shutter disk rotated in response to slide of said slide plate; and a biasing member for biasing said slide plate in said releasing direction;

further comprising:

a charging device, connected to said sprocket wheel, for moving said slide plate in said charging direction in response to said rotation of said sprocket wheel; and a retainer drive device, actuated by movement of said slide plate, for driving said retaining device, said retainer drive device moving said retaining device toward said retaining position when said slide plate is moved away from said released position in said charging direction, and said retainer drive device moving said retaining device toward said unretaining position when said slide plate is located in said released position.

16. A consecutive taking camera as defined in claim 1, wherein said drive device includes a slide plate, slid in said releasing direction toward a released position and in said charging direction toward a charged position, said shutter disk rotated in response to slide of said slide plate; and a biasing member for biasing said slide plate in said releasing direction;

further comprising:

a driven sprocket wheel, engaged with perforations in said film, and caused to make one rotation by said film while wound and moved;

a charging device, connected to said sprocket wheel, for moving said slide plate in said charging direction in response to rotation of said sprocket wheel;

a mask plate device movable between an opening position where said stationary openings are open and a closing position where said stationary openings are closed; and a plate displacing device, associated with said charging device for moving in response to movement of said charging device, said plate displacing device locating said mask plate device in said closing position while said slide plate slides in said charging direction, and said plate displacing device locating said mask plate device in said opening position while said slide plate slides in said releasing direction.

17. A consecutive taking camera as defined in claim 16, further comprising plural auxiliary movable openings, formed in said mask plate device, and superposed on said stationary openings when located in said opening position.

18. A consecutive taking camera as defined in claim 17, wherein said charging device includes:

a rack formed on said slide plate and arranged in a sliding direction of said slide plate;

a charging gear, in mesh with said rack on said slide plate, rotated by said sprocket wheel, for sliding said slide plate in said charging direction, said shutter disk rotated back to said initial position in response to slide of said slide plate;

said plate displacing device includes:

an opener spring for biasing said mask plate device toward said opening position;

a cam follower projection projected from said mask plate device; and a cam plate, formed co-axially with said charging gear, and contacted on said cam follower projection thereabout, for rotating with said charging gear to move said mask plate device, said cam plate rotating through a first section included in one rotation, to move said mask plate device to said closing position against bias of said opener spring, and said cam plate rotating through a second section included in said one rotation, to allow said mask plate to move to said opening position.

19. A consecutive taking camera as defined in claim 18, wherein said charging gear and said cam plate make one rotation while said sprocket wheel makes one rotation.

20. A consecutive taking camera as defined in claim 1, wherein said plural stationary openings are arranged in a matrix of 2×N, where N is 3 or more;

further comprising 2N photographic optical systems, respectively associated with said stationary openings, and arranged together to constitute said single frame having an aspect ratio of substantially 16/9, said optical systems sequentially enabled for creating respective sub-frames on said photo film.

21. A consecutive taking camera as defined in claim 20, wherein said N is 4.

22. A consecutive taking camera as defined in claim 1, further comprising:

a viewfinder for observing a photographic subject through a rectangular viewfield thereof; and a subject frame indicia, formed in said viewfinder and arranged rectangularly, and arrangement of said subject frame indicia having a center located below a center of said viewfield.

23. A consecutive taking camera as defined in claim 22, wherein $$0.4\ A < X < 0.6\ A$$

$$0.65\ B < Y < 0.8\ B$$

where A is a horizontal range of said viewfield, B is a vertical range of said viewfield, X is a horizontal range of said subject frame indicia, and Y is a vertical range of said subject frame indicia.

24. A consecutive taking camera as defined in claim 1, further comprising:

a viewfinder for observing a photographic subject;

a viewfield frame indicia, formed in said viewfinder and arranged rectangularly, for indicating a photographable range; and a subject frame indicia, formed in said viewfinder within said viewfield frame indicia and arranged rectangularly, for framing said subject with reference thereof, arrangement of said subject frame indicia having a center located below a center of said viewfield frame indicia.

25. A consecutive taking camera as defined in claim 24, wherein $$0.4\ A < X < 0.6\ A$$

$$0.65\ B < Y < 0.8\ B$$

where A is a horizontal range of said viewfield frame indicia, B is a vertical range of said viewfield frame indicia, X is a horizontal range of said subject frame indicia, and Y is a vertical range of said subject frame indicia.

26. A consecutive taking camera as defined in claim 1, wherein said drive device includes a slide plate, slid in said releasing direction toward a released position and in said charging direction toward a charged position, said shutter disk rotated in response to slide of said slide plate; and a biasing member for biasing said slide plate in said releasing direction;

further comprising:

a counter wheel for indicating a number of frames;

a driven sprocket wheel, engaged with perforations in said film, and caused to make one rotation by said film while wound and moved;

a one-toothed gear, disposed co-axially with said sprocket wheel, for stepping said counter wheel frame by frame;

a charging device, connected to said sprocket wheel, for moving said slide plate in said charging direction in response to said rotation of said sprocket wheel;

a gear box disposed around at least a portion of said sprocket wheel and/or said one-toothed gear; and a slot, formed in said gear box to extend toward said counter wheel, for supporting a rotary shaft of said sprocket wheel, said film while wound pressing teeth of said sprocket wheel toward said counter wheel at said perforations, for moving said rotary shaft along said slot, so as to press said one-toothed gear against said counter wheel.

27. A consecutive taking camera as defined in claim 26, wherein said counter wheel has a rotary shaft disposed obliquely in front of a rotary shaft of said sprocket wheel; and said slot is extended toward said counter wheel obliquely.

28. A consecutive taking camera as defined in claim 27, wherein said charging device includes:

a charging gear formed co-axially with said sprocket wheel and said one-toothed gear;

a rack formed on said slide plate; and an intermediate gear, in mesh with said charging gear and said rack on said slide plate, driven in said charging direction by said charging gear in response to rotation of said sprocket wheel, for moving said slide plate in said charging direction.

29. A consecutive taking camera as defined in claim 28, wherein said intermediate gear is rotated in said releasing direction in response to movement of said rack caused by said biasing member; and said charging gear is rotated in said releasing direction in response to rotation of said intermediate gear caused by said rack, said intermediate gear having teeth pressing teeth of said charging gear against said counter wheel while biased by said biasing member, so as to move said rotary shaft of said sprocket wheel toward said counter wheel.

30. A consecutive taking camera as defined in claim 29, wherein said intermediate gear is further slidable in an axial direction;

further comprising:

a shutter release device at which said intermediate gear is externally accessible, said shutter release device depressed for pressing said intermediate gear to disengage said intermediate gear from said rack, so as to allow said biasing member to move said slide plate in said releasing direction; and a gear spring for biasing said intermediate gear toward said shutter release device, to reengaging said intermediate gear with said rack after said disengagement.

31. A consecutive taking camera for taking plural exposures time-sequentially in a single frame on photo film, a shutter disk provided with a shutter slit and rotated from an initial position upon a single releasing operation, said shutter slit moved past plural stationary openings, said consecutive taking camera comprising:

a changeover plate device, movable between first and second positions, located in said first position during a first operating step of said shutter disk, for enabling a first one of two groups comprising said stationary openings, and located in said second position during a second operating step of said shutter disk, for enabling a second one of said two groups.

32. A consecutive taking camera as defined in claim 31, wherein said stationary openings are disposed between said changeover plate device and said shutter disk.

33. A consecutive taking camera as defined in claim 31, wherein said shutter disk makes two rotations in association with movement of said drive device; said first and second operating steps are first and second rotations of said shutter disk; said stationary openings are arranged in lower and upper rows; and said first and second groups of said stationary openings are said lower and upper rows of said stationary openings.

34. A consecutive taking camera for taking plural exposures time-sequentially in a single frame on photo film upon a single releasing operation, said consecutive taking camera comprising:

a preventing device for preventing said film from being advanced as far as said one frame until an end of said plural exposures after said releasing operation.

35. A consecutive taking camera for taking plural exposures time-sequentially in a single frame on photo film, a shutter disk provided with a shutter slit and rotated from an initial position upon a single releasing operation, said shutter slit moved past plural stationary openings, said consecutive taking camera comprising:

a winding wheel, externally operated to wind said film as far as said one frame;

a driven sprocket wheel, engaged with perforations in said film, and caused to make one rotation by said film wound and moved;

a retaining device, adapted to accessing said winding wheel, movable from an unretaining position to a retaining position, located in said retaining position for contacting said winding wheel to disable said winding wheel from being rotated, and located in said unretaining position for moving away from said winding wheel to enable said winding wheel to be rotated;

a regulating disk, formed co-axially with said sprocket wheel, for rotating with said sprocket wheel, said regulating disk contacting an end of said retaining device to keep said retaining device in said unretaining position; and a receiving hole, formed in said regulating disk, for receiving said end of said retaining device if said sprocket has a predetermined rotational position, to allow said retaining device to move to said retaining position.

36. A consecutive taking camera as defined in claim 35, wherein said drive device includes a slide plate, slid in said releasing direction toward a released position and in said charging direction toward a charged position, said shutter disk rotated in response to slide of said slide plate; and a biasing member for biasing said slide plate in said releasing direction;

further comprising:

a charging device, connected to said sprocket wheel, for moving said slide plate in said charging direction in response to said rotation of said sprocket wheel; and a retainer drive device, actuated by movement of said slide plate, for driving said retaining device, said retainer drive device moving said retaining device toward said retaining position when said slide plate is moved away from said released position in said charging direction, and said retainer drive device moving said retaining device toward said unretaining position when said slide plate is located in said released position.

37. A consecutive taking camera for taking plural exposures time-sequentially in a single frame on photo film, a shutter disk provided with a shutter slit and rotated from an initial position upon a single releasing operation, said shutter slit moved past plural stationary openings, said consecutive taking camera comprising:

a slide plate, slid in said releasing direction toward a released position and in said charging direction toward a charged position, said shutter disk rotated in response to slide of said slide plate;

a biasing member for biasing said slide plate in said releasing direction;

a driven sprocket wheel, engaged with perforations in said film, and caused to make one rotation by said film while wound and moved;

a charging device, connected to said sprocket wheel, for moving said slide plate in said charging direction in response to rotation of said sprocket wheel;

a mask plate device movable between an opening position where said stationary openings are open and a closing position where said stationary openings are closed; and a plate displacing device, associated with said charging device for moving in response to movement of said charging device, said plate displacing device locating said mask plate device in said closing position while said slide plate slides in said charging direction, and said plate displacing device locating said mask plate device in said opening position while said slide plate slides in said releasing direction.

38. A consecutive taking camera as defined in claim 37, wherein said charging device includes:

a rack formed on said slide plate and arranged in a sliding direction of said slide plate;

a charging gear, in mesh with said rack on said slide plate, rotated by said sprocket wheel, for sliding said slide plate in said charging direction, said shutter disk rotated back to said initial position in response to slide of said slide plate;

said plate displacing device includes:

an opener spring for biasing said mask plate device toward said opening position;

a cam follower projection projected from said mask plate device; and a cam plate, formed co-axially with said charging gear, and contacted on said cam follower projection thereabout, for rotating with said charging gear to move said mask .plate device, said cam plate rotating through a first section included in one rotation, to move said mask plate device to said closing position against bias of said opener spring, and said cam plate rotating through a second section included in said one rotation, to allow said mask plate to move to said opening position.

39. A consecutive taking camera for taking plural exposures time-sequentially in a single frame on photo film upon a single releasing operation with light from a subject applied to said film, said consecutive taking camera comprising:

2N taking lenses arranged in a matrix of 2×N, for focussing said subject light upon said film, where N is 3 or more; and 2N exposure apertures, respectively disposed in front of said taking lenses, and arranged together to constitute said single frame having an aspect ratio of substantially 16/9, said exposure apertures sequentially enabled for creating respective sub-frames on said photo film.

40. A consecutive taking camera for taking plural exposures time-sequentially in a single frame on photo film, upon a single releasing operation opening/closing plural stationary openings, said consecutive taking camera comprising:

a viewfinder for observing a photographic subject through a rectangular viewfield thereof; and a subject frame indicia, formed in said viewfinder and arranged rectangularly, and arrangement of said subject frame indicia having a center located below a center of said viewfield.

41. A consecutive taking camera as defined in claim 40, wherein $$0.4 A \leq X \leq 0.6 A$$

$$0.65 B \leq Y \leq 0.8 B$$

where A is a horizontal range of said viewfield, B is a vertical range of said viewfield, X is a horizontal range of said subject frame indicia, and Y is a vertical range of said subject frame indicia.

42. A consecutive taking camera for taking plural exposures time-sequentially in a single frame on photo film, upon a single releasing operation opening/closing plural stationary openings, said consecutive taking camera comprising:

a viewfinder for observing a photographic subject;

a viewfield frame indicia, formed in said viewfinder and arranged rectangularly, for indicating a photographable range; and a subject frame indicia, formed in said viewfinder within said viewfield frame indicia and arranged rectangularly, for framing said subject with reference thereof, arrangement of said subject frame indicia having a center located below a center of said viewfield frame indicia.

43. A consecutive taking camera as defined in claim 42, wherein $$0.4 A < X < 0.6 A$$

$$0.65 B < Y < 0.8 B$$

where A is a horizontal range of said viewfield frame indicia, B is a vertical range of said viewfield frame indicia, X is a horizontal range of said subject frame indicia, and Y is a vertical range of said subject frame indicia.

44. A camera for taking an exposure on photo film upon a releasing operation opening/closing a shutter device, said camera comprising:

a slide plate, slid in a releasing direction in response to said releasing operation, for driving said shutter device;

a biasing member for biasing said slide plate in said releasing direction;

a counter wheel for indicating a number of frames;

a driven sprocket wheel, engaged with perforations in said film, and caused to make one rotation by said film while wound and moved;

a one-toothed gear, disposed co-axially with said sprocket wheel, for stepping said counter wheel frame by frame;

a charging device, connected to said sprocket wheel, for moving said slide plate in a charging direction opposite to said releasing direction, in response to said rotation of said sprocket wheel;

a gear box disposed around at least a portion of said sprocket wheel and/or said one-toothed gear; and a slot, formed in said gear box to extend toward said counter wheel, for supporting a rotary shaft of said sprocket wheel, said film while wound pressing teeth of said sprocket wheel toward said counter wheel at said perforations, for moving said rotary shaft along said slot, so as to press said one-toothed gear against said counter wheel.

* * * * *